(12) United States Patent
Abbadessa

(10) Patent No.: US 6,192,244 B1
(45) Date of Patent: Feb. 20, 2001

(54) ANALYSIS OF NEIGHBOURING CELLS IN CELLULAR TELECOMMUNICATIONS SYSTEMS

(75) Inventor: Daniele Abbadessa, Bristol (GB)

(73) Assignee: Hewlett Packard Company, Palo Alto, CA (US)

(*) Notice: Under 35 U.S.C. 154(b), the term of this patent shall be extended for 0 days.

(21) Appl. No.: 09/123,032

(22) Filed: Jul. 27, 1998

(30) Foreign Application Priority Data

Jul. 29, 1997 (EP) .................................................. 97305681

(51) Int. Cl.⁷ ....................................................... H04Q 7/22
(52) U.S. Cl. ........................ 455/436; 455/437; 455/446; 455/424
(58) Field of Search ..................................... 455/423–425, 455/446–447, 436–437, 509, 514

(56) References Cited

U.S. PATENT DOCUMENTS

| | | | |
|---|---|---|---|
| 5,561,841 | * 10/1996 | Markus ................................. | 455/446 |
| 5,854,981 | * 12/1998 | Wallstedt et al. ..................... | 455/439 |
| 5,870,385 | * 2/1999 | Ahmadi et al. ....................... | 370/252 |
| 5,915,221 | * 6/1999 | Sawyer et al. ........................ | 455/437 |
| 5,926,762 | * 7/1999 | Arpee et al. .......................... | 455/447 |
| 5,966,657 | * 10/1999 | Sporre ................................... | 455/425 |
| 5,995,840 | * 11/1999 | Dorenbosch et al. ................ | 455/447 |
| 6,021,329 | * 2/2000 | Kornestedt et al. .................. | 455/446 |
| 6,052,593 | * 4/2000 | Guimont et al. ...................... | 455/446 |

FOREIGN PATENT DOCUMENTS

WO97/06648  2/1997 (WO).

OTHER PUBLICATIONS

European Search Report, EP 97 30 5681, Mar. 18, 1998.
Ericsson Review, No. 1, 1994, pp. 32–39, Greger Berg, "Operations Support System for CME 20".

* cited by examiner

Primary Examiner—William G. Trost

(57) ABSTRACT

A method is disclosed of analyzing lists of neighboring cells in a cellular telecommunications system comprising a plurality of active mobile stations and a static network, the static network having a first cell and a plurality of cells neighboring the first cell, each of the cells having a base station. The method is applicable to GSM and GSM-like systems. In the case of a GSM system, the analyzing method may comprise the steps of: extracting from the static network the GSM MEAS RES produced by the mobile stations in said first cell and producing a reporting list including, for each position in the GSM BA(SACCH) list, the number of times that any of the base station identifiers has been reported for that position; extracting from the static network GSM HANDO CMD messages for handovers from said first cell, and producing a handover list of the GSM BCCHs and corresponding GSM BSICs in the extracted handover messages; correlating the reporting list and the handover list with respect to the BCCHs; and analyzing the correlated lists to determine whether any of the control channels is affected by bad frequency planning.

18 Claims, 14 Drawing Sheets

(spectrum) $S = f_1+f_2+f_3+f_4$ (cluster size) $N = 4$ (frequency reuse factor) $F = 1/N$ 1 - CHAN ACTIV
2 - RF CHAN REL
3 - CHAN ACTIV NACK
4 - EST IND
5 - MEAS RES
6 - DATA REQ (HANDO CMD)
7 - DATA IND (HANDO FAIL)

Normal Transition ⎯⎯⎯⎯⎯→

Abnormal Transition ------------→

Ba LIST FOR CELL01A

CELL INFORMATION

LAC: 1    CELL: CELL01A

NEIGHBOUR

BCCHs REPORTED FROM MEASUREMENTS: 19

BCCHs REPORTED FROM HANDOVERS: 18

| INDEX | BCCH | # REPORTED | NEIGHBOURS |
|---|---|---|---|
| 0 | 771 | 23584 | 44 |
| 1 | 772 | 41386 | 40 |
| 2 | 773 | 10280 | 47 |
| 3 | 776 | 74965 | 40 |
| 4 | 792 | 79127 | 44 |
| 5 | 796 | 78193 | 44 |
| 6 | 804 | 11797 | 45 |
| 7 | 811 | 29333 | 42 |
| 8 | 816 | 63181 | 40 |
| 9 | 829 | 7305 | 45 |
| 10 | 835 | 0 | 44 |
| 11 | 836 | 52554 | 44 |
| 12 | 842 | 54984 | 45 |
| 13 | 843 | 3086 | 47 |
| 14 | 845 | 125042 | 46 |
| 15 | 847 | 25836 | 45 |
| 16 | 848 | 72089 | 42 |
| 17 | nil | 47500 | |
| 18 | nil | 7 | |

PRINT TABLE    CLOSE

*FIG. 12*

ANALYSIS OF NEIGHBOURING CELLS IN CELLULAR TELECOMMUNICATIONS SYSTEMS

This invention relates to the analysis of neighbouring cells in cellular telecommunications systems.

The introduction of the cellular concept is one of the major breakthroughs in solving the problem of spectral congestion and user capacity experienced by early mobile radio systems. In cellular networks, the whole area covered is divided into small cells and the coverage is assured by lower powered transmitters. The whole available spectrum is also divided into small portions and assigned to groups of adjacent cells to form a cluster. Afterwards, this cluster is regularly repeated over the whole area to be covered. Typical values of the cluster size are 4, 7 and 12, but different cluster sizes might be necessary to achieve the desired capacity. The reciprocal of the cluster size is instead called the frequency re-use factor.

The design process of selecting and allocating frequencies to all cells within a network is called frequency planning. This task, which might look easy, is very difficult indeed since representations of cells using hexagons are only a high level abstraction. In reality, cell shapes are very irregular so that the application of the cluster concept is very difficult. The difficulty of the frequency planning task significantly increases with the increase of the frequency re-use factor.

Increasing the re-use factor or equally reducing the cluster size increases system capacity since the whole spectrum, partitioned into smaller groups, is assigned to smaller areas and therefore it can be reused more often. But interference limits the increase of the re-use factor. In fact, the smallest achievable value of the cluster size is related to the interference level that both mobiles and base stations can tolerate whilst maintaining the desirable quality of communications. Therefore, cells with the same frequency must be far away from each other to ensure that the interference caused by this re-use, i.e. co-channel interference, is kept below acceptable levels.

Clearly, two opposite requirements affect the re-use factor. Capacity pushes it up and interference pushes it down so that finding the right compromise is not easy at all. Furthermore, macro/micro cell architectures increase the complexity of the frequency planning due to the layered nature of the problem.

Patent document WO-A-97/06648 describes a method of neighbourhood cell list creation and verification for use with a cellular telecommunications system comprising a plurality of active mobile stations and a static network, the static network having a first cell and a plurality of cells neighbouring the first cell, each of the cells having a base station, and each mobile station in said first cell reporting messages to the static network indicating strengths of signals detected by that mobile station from base stations in neighbouring cells. The method of WO-A-97/06648 comprises the steps of: extracting from the static network such reporting messages for said first cell; producing a list including, for each of the neighbouring base stations, the average of the received signal strengths; ordering the list by average signal strength, and using the ordered list to create or update a neighbouring cell list.

The method of WO-A-97/06648 does not take into account various anomalies which arise in such systems, especially GSM and GSM-like systems.

A first aspect of the present invention relates to a method of analysing lists of neighbouring cells in a cellular telecommunications system comprising a plurality of active mobile stations and a static network, the static network having a first cell and a plurality of cells neighbouring the first cell, some of the neighbouring cells being determined by an operator of the system as planned neighbouring cells, each of the cells having a base station.

The first aspect of the invention makes use of the features that, in such a system, each base station transmits, on a control channel, a signal including a base station identifier of that base station; each mobile station in the first cell is provided with an ordered control channel list of control channel frequencies to be detected by that mobile station; and each mobile station in said first cell reports messages to the static network indicating the base station identifiers of control channels detected by that mobile station and the position in the control channel list of the respective control channel. These may be existing features of the system, such as a GSM or GSM-like system.

In accordance with the first aspect of the present invention, the method of analysing neighbouring cells comprises the steps of: extracting from the static network such reporting messages for said first cell and producing a reporting list including, for each position in the control channel list, the number of times that any of the base station identifiers has been reported for that position; obtaining a planned neighbour list of the control channels and respective base station identifiers of the planned neighbouring cells; correlating the reporting list and the planned neighbour list with respect to the control channels; and analysing the correlated lists to determine whether any of the control channels is affected by bad frequency planning.

The first aspect of the invention therefore can take account of the fact that two or more neighbouring cells, whether planned neighbouring cells or not, may be using the same control channel.

The analysing step may include the steps of: determining whether, for any of the control channels, there is more than one base station identifier in the planned neighbour list; and if so, classifing that control channel in a first class (which will sometimes be hereinafter called "red"). This indicates that there are two or more planned neighbouring cells using the same control channel and that immediate attention may be required.

Additionally or alternatively, the analysing step may include the steps of: determining whether, for any of the control channels, there is only one base station identifier in the reporting list which does not correspond to the base station identifier in the planned neighbour list; and if so, classifying that control channel in a second class (which may be the same as the first class (red)). This indicates that there is a neighbouring cell using the base channel of a planned neighbouring cell, but which is not a planned neighbouring cell, and that immediate attention may be required.

Additionally or alternatively, the analysing step may include the steps of: determining whether, for any of the control channels, there is more than base station identifier in the reporting list; if so, determining whether that one of the base station identifiers in the reporting list having the larger/largest number of reports does not correspond to the base station identifier in the planned neighbour list; and if so, classifying that control channel in a third class (which may be the same as the first and/or second class (red)). This indicates that there are a planned neighbouring cell and a non-planned neighbouring cell using the same base channel, with the non-planned neighbouring cell being more significant, and that immediate attention may be required.

Additionally or alternatively, the analysing step may include the steps of: determining whether, for any of the control channels, there is more than one base station identifier in the reporting list; if so, determining whether that one of the base station identifiers in the reporting list having the larger/largest number of reports corresponds to the base station identifier in the planned neighbour list but is not predominant; and if so, classifying that control channel in a fourth class (which will sometimes be hereinafter called "yellow"). This indicates that there are a planned neighbouring cell and a non-planned neighbouring cell using the same base channel, with the planned neighbouring cell being more significant but not predominant, and that further analysis may be required. Various measures of predominance may be employed. In one example, a base station identifier which has at least ten times as many reports as another base station identifier is said to be predominant. In another example, a factor of one hundred is employed.

Additionally or alternatively, the analysing step may include the steps of: determining whether, for any of the control channels, there is at least one base station identifier in the reporting list but not in the planned neighbour list; and if so, classifying that control channel in a fifth class (which will sometimes be hereinafter called "blue"). This class can be thought of as "unclassified".

Additionally or alternatively, the analysing step may include the steps of: determining whether, for any of the control channels, the base station identifier in the planned neighbour list cannot be unambiguously correlated with the, or one of the, base station identifiers in the reporting list; and if so, classifying that control channel in a sixth class (which may be the same as the fifth class (blue)).

The analysing step may further include the steps of determining whether any of the control channels is not classified in any of the aforementioned classes; and if so, classifying that control channel in a seventh class (which will sometimes be hereinafter called "green"). This indicates an ideal or near ideal case.

The step of obtaining the planned neighbour list may comprise obtaining data therefor from the operator of the system.

Alternatively, the method may be used with a system in which the static network generates handover messages instrucing mobile stations in the first cell to switch to different cells, each handover message including the control channel and base station identifier of said different cell. In this case, the step of obtaining the planned neighbour list may comprise the step of extracting from the static network such handover messages for handovers from said first cell, and producing the planned neighbour list from the control channels and corresponding base station identifiers in the extracted handover messages.

The method may be used with a system in which the control channels are ordered in the control channel list in accordance with frequency (or channel number). In this case, the correlating step preferably includes the step of primarily attempting to match the base station identifiers in the planned neighbour list, ordered according to control channel frequency (or channel number), with the base station identifiers in the reporting list, ordered according to position in the control channel list. Also, in this case, the correlation step preferably involves the steps of progressing through the planned neighbour list in order of control channel frequency (or channel number) and progressing through the reporting list in order of position in the control channel list.

The correlating step may include, in each step of the progression: determining whether the base station identifier for the current position in the planned neighbour list is related to the base station identifier, or any of the base station identifiers, for the current position in the reporting list but not to the base station identifier, or any of the base station identifiers, for the next position in the reporting list; and if so, determining that that base station identifier in that current position in the planned neighbour list is associated with that base station identifier in that current position in the reporting list.

Additionally or alternatively, the correlating step may include, in each step of the progression: determining whether the base station identifier for the current position in the planned neighbour list is related to the base station identifier, or any of the base station identifiers, for the current position in the reporting list and to the base station identifier, or any of the base station identifiers, for the next position in the reporting list. If such a determination is made, then the steps are performed of (a) determining whether the base station identifier for the next position in the planned neighbour list is related to the base station identifier, or any of the base station identifiers, for the next position in the reporting list but not to the base station identifier, or any of the base station identifiers, for the next but one position in the reporting list, and, if so, determining that that base station identifier in that current position in the planned neighbour list is associated with that base station identifier in that current position in the reporting list; and/or (b) determining whether the base station identifier for the next position in the planned neighbour list is not related to the base station identifier, or any of the base station identifiers, for the next position in the reporting list, and, if so determining that that base station identifier in that current position in the planned neighbour list cannot be unambiguously associated with a base station identifier in the reporting list; and/or (c) determining whether the base station identifier for the next position in the planned neighbour list is related to the base station identifier, or any of the base station identifiers, for the next position in the reporting list and to the base station identifier, or any of the base station identifiers, for the next but one position in the reporting list, and, if so, recursively repeating the determining steps in respect of at least the subsequent positions in the planned neighbour list and the reporting list.

The method may be used with a system in which the control channel list with which each mobile station is provided can change upon the mobile station changing from an idle mode to an active mode, and in this case the method preferably further includes the steps of: detecting when one of the mobile stations changes from its idle mode to its active mode; and in response to such a detection, temporarily discarding such reporting messages extracted from the static network and relating to that mobile station. Additionally or alternatively, the method may be used with a system in which the control channel list with which each mobile station is provided can change upon the mobile station being handed over from one cell to another, and in this case the method preferably further includes the steps of: detecting when one of the mobile stations is handed over from one cell to another; and in response to such a detection, temporarily discarding such reporting messages extracted from the static network and relating to that mobile station. In either case, the detection and discarding steps are preferably controlled by a respective finite state machine for each mobile station which is in its active mode.

The method of the first aspect of the present invention was conceived for use with such a system which is a GSM system, but is also applicable to other a "GSM-like system", and preferably: the static network is a GSM Public Land Mobile Network ("PLMN") or the like; the control channels are GSM Broadcast Control Channels ("BCCH"s) or the like; the base station identifiers are GSM Base Station Identity Codes ("BSIC"s) or the like; the control channel list is a GSM BCCH Allocation ("BA") list or the like provided on a GSM Slow Association Control Channel ("SACCH") or the like; and the reporting messages are GSM Measurement Result ("MEAS RES") messages or the like.

In accordance with a second aspect of the present invention, there is provided an apparatus for performing the method of any preceding claim, the apparatus comprising: means for extracting from the static network such reporting messages for said first cell and producing the reporting list including, for each position in the control channel list, the number of times that any of the base station identifiers has been reported for that position; means for receiving or generating a planned neighbour list of the control channels and respective base station identifiers of the planned neighbouring cells; means for correlating the reporting list and the planned neighbour list with respect to the control channels; and means for analysing the correlated lists to determine whether any of the control channels is affected by bad frequency planning.

DESCRIPTION OF SPECIFIC EMBODIMENT

A specific embodiment of the present invention will now be described, purely by way of example, with reference to the accompanying drawings, in which:

FIG. 12 is a window for a particular selected cell;

1 INTRODUCTION TO SPECIFIC EMBODIMENT

In the embodiment now to be described, neighbouring cell list allocations in GSM-like networks are analysed. Neighbouring cell frequencies are examined to evaluate to what extent the current planning is different from the ideal case. Furthermore, the end result of such an investigation is not only the identification of the frequencies that might be affected by bad frequency planning, but further information is given to gain a better understanding of the problem and eventually to identify and eliminate its causes.

Bad frequency planning might affect mobile networks in several ways. A typical case that is likely to lead to co-channel interference is constituted by two neighbouring cells transmitting the same frequency. Moreover, signal strength of some adjacent cells might also be so strong that the signal from other adjacent cells is hardly received. Neighbouring cell lists play a crucial role both for cell camping and handover procedures and the above problems could dramatically affect such procedures. In particular, handover failures affect users directly, with calls being interrupted.

In the embodiment of the invention, the main source of input of such an analysis in the RF measurements regularly taken and sent to the network by mobiles. The use of mobiles as a spread RF measurement infrastructure presents some advantages with respect to traditional data acquisition methods as will be mentioned in section 3 below.

Challenging issues related to data storage and visualisation are also addressed with particular emphasis on the definition of a proper navigation path to guide operators through the available data in order to easily spot and understand sources of bad frequency planning whenever they occur.

2 CELLULAR NETWORKS

Figure 1:
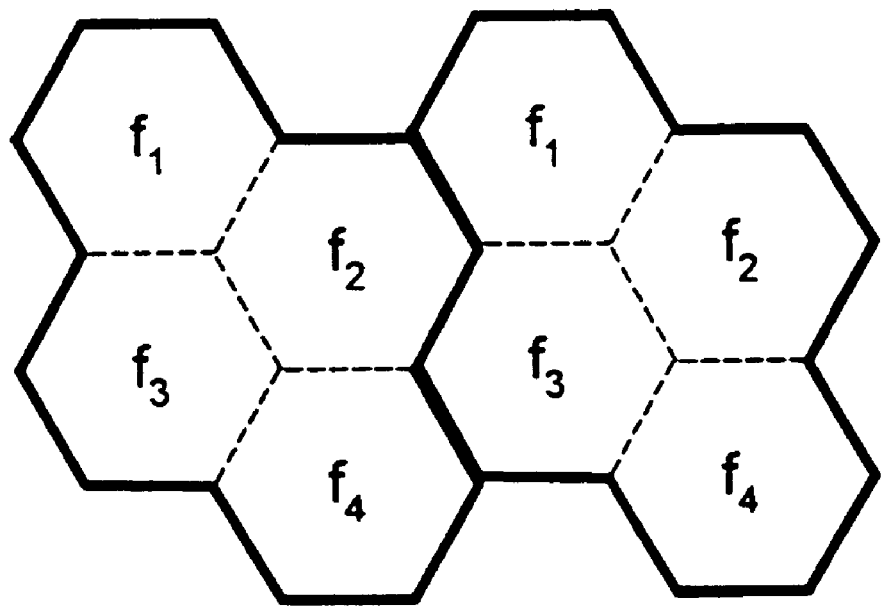
FIG. 1 is a diagram to illustrate the concept of clusters of cells in a cellular telecommunications system.

The introduction of the cellular concept is one of the major breakthroughs in solving the problem of spectral congestion and user capacity experienced by early mobile radio systems. In cellular networks, the whole area covered is divided into small cells and the coverage is assured by lower powered transmitters. The whole available spectrum is also divided into small portions and assigned to groups of adjacent cells. FIG. 1 shows a case where the whole available spectrum S is divided into four portions: $f_1$, $f_2$, $f_3$ and $f_4$. Each frequency $f_1$ is assigned to a group of adjacent cells to form a cluster. Afterwards, this cluster is regularly repeated over the whole area to be covered. Typical values of the cluster size are 4, 7 and 12, but different cluster sizes might be necessary to achieve the desired capacity. The reciprocal of the cluster size is instead called the frequency re-use factor.

The design process of selecting and allocating frequencies to all cells within a network is called frequency planning. This task, which might look easy, is very difficult indeed since representations of cells using hexagons are only a high level abstraction. In reality, cell shapes are very irregular so that the application of the cluster concept is very difficult. The difficulty of the frequency planning task significantly increases with the increase of the frequency re-use factor.

Increasing the re-use factor or equally reducing the cluster size increases system capacity since the whole spectrum, partitioned into smaller groups, is assigned to smaller areas and therefore it can be reused more often. But interference limits the increase of the re-use factor. In fact, the smallest achievable value of the cluster size is related to the interference level that both mobiles and base stations can tolerate whilst maintaining the desirable quality of communications. Therefore, cells with the same frequency must be far away from each other to ensure that the interference caused by this re-use, i.e. co-channel interference, is kept below acceptable levels.

Clearly, two opposite requirements affect the re-use factor. Capacity pushes it up and interference pushes it down so that finding the right compromise is not easy at all. Furthermore, macro/micro cell architectures increase the complexity of the frequency planning due to the layered nature of the problem.

2.1 GSM

In GSM, frequency re-use and planning are much more complex than in other cellular systems because of the possibility of assigning several frequencies to each cell. This might occur for two reasons: several transceivers are placed in one cell to provide a certain level of capacity; or the frequency hopping feature is employed.

Due to the specific architecture of the GSM system, a specific frequency always plays a very important role within one cell. This frequency, which is used by the control channels, is known as the Broadcast Control Channel or BCCH frequency. Its peculiarities consist in continuous emission, fixed transmission power level and finally the prohibition of hopping. These restrictions simplify the number of tasks the mobile performs to choose the best cell to camp on, in idle mode, and to report reliable measurements of neighbouring cells, in active mode.

In such a system, the frequency assignment problem can be split in two sub-problems. One is related to the assignment of the BCCH frequency to each cell. The other sub-problem deals with the assignment of other frequencies that might be needed in cells with more than one transceiver or for hopping sequences. The latter task is quite complex when hopping frequency capability is implemented because a set of several frequencies is assigned to each transceiver. This complexity causes a higher robustness to co-channel interference since statistically the simultaneous use of the same frequency by two transceivers with overlapping coverage area might happen only sporadically. Instead special attention is required for the assignment of BCCH frequencies because of the essential role they play in GSM and a larger re-use factor is desirable.

The requirement for mobiles to report neighbouring BCCH frequencies raises many technical issues. Continuous and constant power level transmission of BCCH allows mobiles to make reliable measurements of neighbouring BCCH carriers whenever they can, without further constraints on their own scheduling. Camping and handover procedures are also simplified by explicitly providing the list of BCCH carriers that mobiles must monitor. This list is known as the BCCH Allocation list or BA list. It is periodically broadcast within each cell in order to be received by mobiles in idle mode and it is continuously sent to each mobile in dedicated mode, on the active Slow Associated Control Channel or SACCH.

The signal received from the set of frequencies being monitored by each mobile is subject to further processing in order to distinguish those frequencies that are used as BCCH carriers from other potentially interfering frequencies. Mobiles achieve this task by looking for the FCCH (Frequency Correction Channel) and SCH (Synchronisation Channel) in the signal received from adjacent cells. Decoding the SCH is also required to get the BSIC (Base Station Identity Code).

This other parameter, i.e. the BSIC, is an essential part of the frequency planning. In proximity to national borders or in areas of very tight frequency re-use, it might happen that mobiles are able to capture more than one BCCH carrier using the same frequency. The role of the BSIC is to allow mobiles to discriminate between cells transmitting their broadcast channels on the same frequency. BSIC planning is also required. This task is fairly easy and it consists of allocating different BSICs to cells that use the same BCCH frequency where overlapping coverage might exist.

The pair BCCH/BSIC is often used in GSM to identify a cell for radio purposes, e.g. handover, but it does not need to be as a unique network-wide cell identifier. Uniqueness need only be ensured on a local scale as a result of BCCH and BSIC planning. The set of values available for such pairs depend on the specific network. BCCH range is a function of the available spectrum. Instead BSIC is a combination of two values: NCC (Network Colour Code) and BCC (Base Station Colour Code). The former is a sort of network identifier that assumes the same value within a network. The latter, i.e. BCC, consists of three bits that can freely be allocated.

2.1.1 Neighbouring Cell Measurements in GSM

As mentioned before, mobiles, in active mode, take measurements of neighbouring cells and periodically, they send these measurements to the network. The Measurement Result (MEAS RES) message is used for this purpose. In this connection reference is directed to ETSI-GSM Technical Specification, GSM 08.58, Version 5.2.0, "Base Station Controller—Base Transceiver Station (BTS—BSC) interface; layer 3 specification", December 1996. It contains uplink measurements taken by the Base Transceiver Station (BTS) and optionally, it could also carry downlink and neighbouring cell measurements taken by the mobile. Another piece of relevant information carried by these messages the Timing Advance (TA). In this connection reference is directed to ETSI-GSM Technical Specification, GSM 05.10, Version 5.1.0, Draft, "Radio subsystem synchronisation", December 1996.

The availability of downlink measurements and TA is strictly related to the current condition of the radio link since in case of a poor radio link these messages might get lost. Such measurements are sent at a rate of about one every half a second.

Constraints on the maximum size of signalling messages over the air interface limit up to six the number of adjacent cells being reported. In the event that BCCH carriers of more than six adjacent cells have been measured, only measurements corresponding to the six cells best received are included in the reporting message. This size constraint also affects the way in which adjacent cell measurements are reported. For each adjacent cell, the average of the received signal strength of its BCCH frequency together with its BSIC is reported.

Each neighbouring cell measurement consists of three values:

BCCH_FREQ_NCELL$_i$;
BSIC_NCELL$_i$; and
RXLEV_NCELL$_i$.

The BCCH-FREQ-NCELL$_i$ is the binary representation of the position, starting with 0, of the $i^{th}$ neighbouring cell BCCH carrier in the serving cell BA list. Reporting the position of the frequency within the BA list instead of its absolute value is a result of message size constraints. For example, let us suppose a BA list of 650, 687, 715, and 740. For measurements related to this adjacent cell with BCCH carrier 715, BCCH_FREQ_NCELL will contain the value two, i.e. the frequency position in the BA list, instead of the absolute frequency number 715. BSIC_NCELL$_i$ is the BSIC value of the $i^{th}$ neighbouring cell. Finally, RXLEV_NCELL$_i$ is the average of the received signal strength of the $i^{th}$ neighbouring cell. The signal strength is actually coded in 64 values as stated in the GSM standard; see ETSI-GSM Technical Specification, GSM 05.08, Version 5.2.0, Draft, "Radio subsystem link control", December 1996.

As mentioned earlier, mobiles derive the BA list they use from information received on the BCCH, in idle mode, and on the SACCH, in dedicated mode. The GSM standard allows the existence of two BA lists referred to as the BA(BCCH) list and the BA(SACCH) list. The former contains the list of frequencies that mobiles are required to monitor while camped on a cell and it is periodically broadcast on the downlink common control channel. In dedicated mode, the BA(SACCH) is continuously sent to the mobile and it contains the list of BCCH carriers to be monitored for handover purposes.

Figure 2:
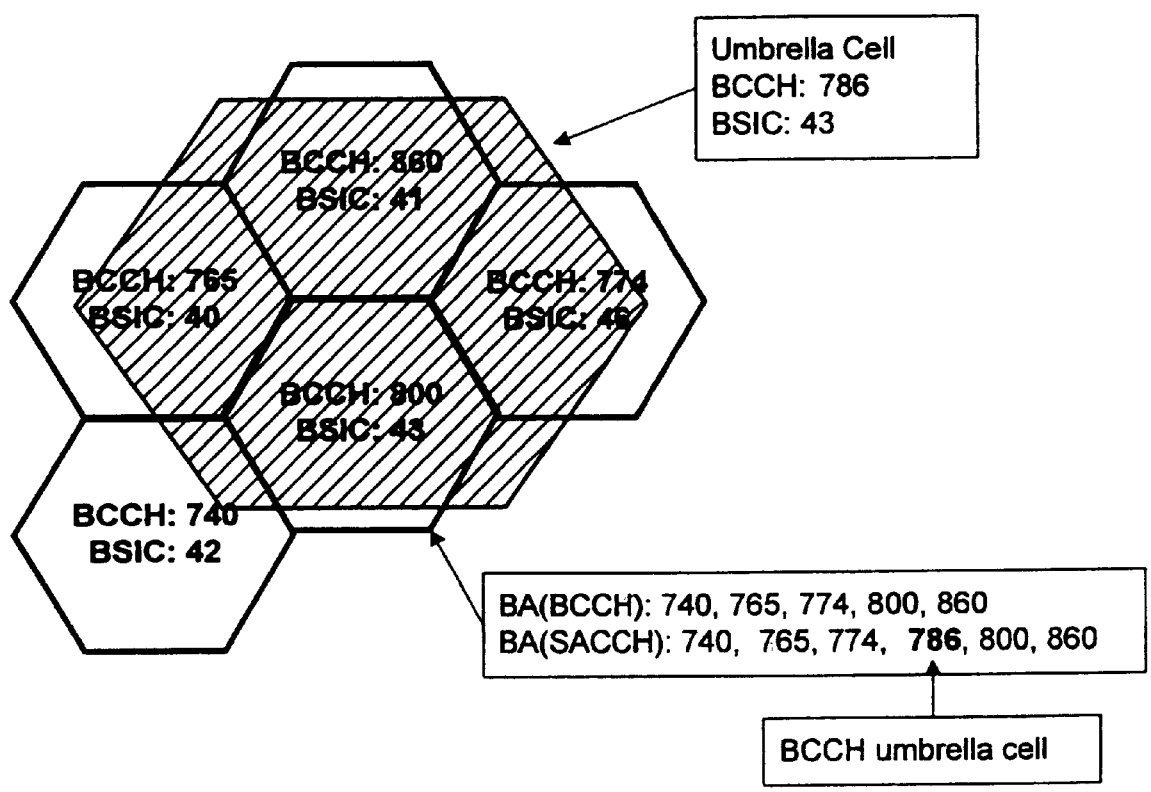
FIG. 2 is a diagram which illustrates the use of an umbrella cell in such a system.

The BA(BCCH) and BA(SACCH) lists need not necessarily be the same, since certain geographical areas might require umbrella cells to comply with high traffic demand. In such cases, the BA(SACCH) list might contain umbrella cells as shown in FIG. 2, which are only used to hand over mobiles but not to be camped on, or the BCCH carrier of the serving cell might be omitted; see ETSI-GSM Technical Specification, GSM 03.22, Version 5.0.0, Draft, "Functions related to Mobile Station (MS) in idle mode", December 1996.

The existence of these two lists affects the reporting procedure and the GSM standard clearly addresses the cases where changes in the BA list might occur during the lifetime of a connection. As stated in GSM 05.08, Version 5.2.0, supra:

The measurements in the mobile shall be based on the current BA list [. . . ] available at the beginning of the reporting period. At the transmission from idle mode to a TCH or a SDCCH the current BA list is the BA (BCCH), later the latest received complete BA(SACCH). [. . . ] The measurement process on carriers contained in both lists is, therefore, continuous.

If the current BA list does not refer to the serving cell, e.g. after the handover, this shall be indicated and no measurement values for neighbour cells shall be reported. If the mobile returns to the previous cell after a failure of the handover procedure the description above applies. As a consequence, a BA list [. . . ] received on the SACCH in the cell to which the handover failed shall be regarded as the current one, which may lead to interruptions in the measurement reporting as the BA list does not refer to the serving cell. As an option, the mobile may in this case remember the last received BA list [. . . ] in the old cell and regard those as the current ones when returning.

In the remainder of this specific description, references to the BA list mean the BA(SACCH) list unless explicitly specified.

3 PROPOSED APPROACH

Tools available to assist operators' planning groups to carry out the frequency planning task are based mainly on simplified representation of the world and mathematical models to predict RF propagation. However, such tools leave some uncertainty so that field measurements are required to evaluate to what extent predictions are different from reality.

Ideally, for each BCCH frequency defined in the BA list, mobiles should only pick up the signal emitted by one neighbouring cell. In reality, it is likely that mobiles report signals emitted by several adjacent cells, all using the same BCCH frequency. These cases can be spotted since the set of measurements referring to the same BCCH frequency are reported with different BSICs. Clearly, in these cases there is a deviation from the ideal behaviour, which shows the existence of unplanned and/or undesired neighbouring cells.

Such deviation might be caused by unpredicted RF propagation or by mistakes in the frequency planning. How these undesired neighbouring cells affect the role of the real planned neighbouring cell depends on each case but undoubtedly, the handover procedure is the one most affected.

The technique used in the embodiment is intended to be a methodology to spot the above mentioned abnormal behaviour and quantify the deviation from the ideal case of those frequencies of the BA list affected by bad frequency planning. To achieve this, on a cell basis, each frequency of the BA list is classified as belonging to one of four groups. Each group is labelled with a colour and the colour itself expresses the grade of the deviation from the ideal case. The fact has to be stressed that these colours must not be confused with the colour code in the BSIC. Red refers to frequencies significantly affected by problems and immediate attention is needed. Yellow is instead assigned to frequencies slightly deviating from an ideal behaviour but further analysis might reveal more serious problems. Frequencies very close to the ideal case are in green. Finally, blue denotes BCCH frequencies of neighbouring cells to which no handover is ever attempted.

Figure 3:
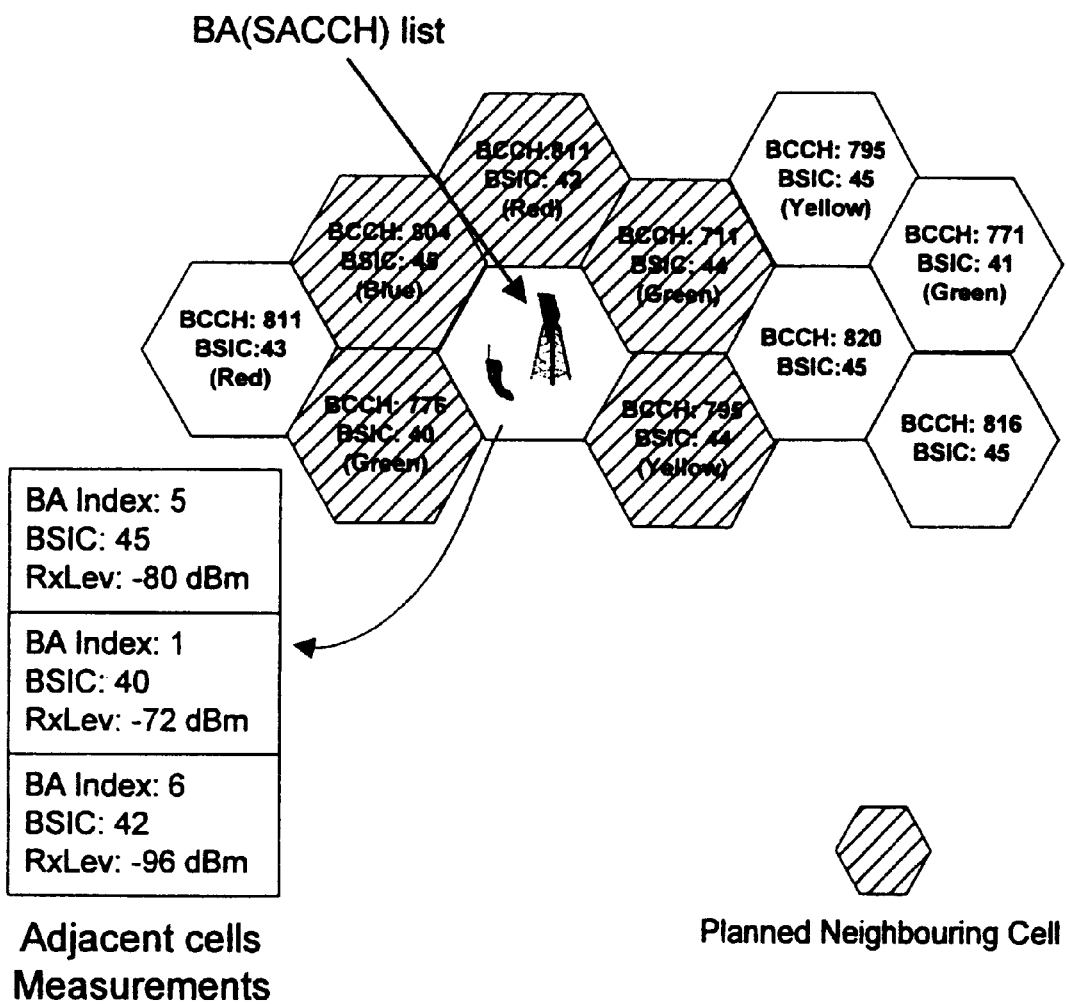
FIG. 3 is a diagram which illustrates the concept of neighbouring cell classification.

FIG. 3 shows a hypothetical scenario that will help to understand the concept of neighbouring cell classification. This figure shows a mobile currently engaged in a call and reporting measurements of adjacent cells. Adjacent cells from which the BA list is derived, i.e. planned neighbours, are shown shaded. The other cells not planned as neighbours are shown unshaded. The BA(SACCH) of the serving cell is also shown. The entries of the BA list are shown in FIG. 3 as being already classified but the exact procedure will be explained in section 3.2 below.

As mentioned in section 1 above, the main source of input is the measurements taken by mobiles. This approach presents a few advantages in respect to the methods currently used by operators, such as drive-around surveys. In fact, this methodology allows one to build a measurement web which is as much spread out as are the users over the mobile network. Compared to the traditional drive-around surveys and field measurements, measurements taken by mobiles offer a view of the local network behaviour as perceived by users whenever and wherever they make use of their mobiles. Since no changes are required to the current mobile capabilities, operators finally obtain the free capability of taking RF measurements without deploying any further dedicated RF equipment.

Accuracy might be a drawback of this system. As stated by the GSM standard in ETSI-GSM Technical Specification, GSM 04.08, Version 5.4.0, Draft, "Mobile radio interface layer 3 specification", November 1996, measurements taken by mobiles must have an accuracy of ±4 DB. This might not seem very promising but it should not be forgotten that the network bases its decision about handover on such measurements and accuracy.

3.1 Data Gathering

On receipt of a MEAS RES message carrying valid downlink measurements the neighbouring cell information is extracted from the Abis interface of the PLMN and processed. This phase of data gathering is aimed at building the list of all adjacent cells reported for each frequency of the BA list. The result of this phase is a set of data than can be easily be put in a table, as shown below:

TABLE 1

Data from measurements

| BA Index | BSICs reported |
|---|---|
| 0 | [44, 23582] [41, 23] |
| 1 | [40, 41386] |
| 2 | [47, 10279] [42, 11] |
| 3 | [40, 74965] |
| 4 | [42, 79127] |
| 5 | [44, 66335] [45, 11842] [46, 15] |
| 6 | [45, 11795] [43, 52] |
| 7 | [43, 21397] [42, 7903] [41, 33] |
| 8 | [40, 63023] [45, 139] [43, 13] [42, 6] |

In the above table, each row refers to an entry in the BA list. As mentioned earlier in section 2.1.1, measurements do not explicitly contain the value of the BCCH frequencies they refer to but instead they contain the position that such frequencies occupy in the BA list. Thus BA_Index refers to the BCCH_FREQ_NCELL value. The BSICs_reported refers to the list of all the adjacent cells that have been reported for a specific entry of the BA list. Each pair contains the BSIC value followed by the number of times it has been reported.

A first look at Table 1 shows that some frequencies, such as the ones with a BA_Index value of 1, 3 and 4, behave very well. They follow the ideal case, since the signal reported on those frequencies has been caused by only one adjacent cell, i.e. the planned neighbour. Other elements of the BA list, e.g. 0, 2, 6 and 8, behave reasonably well. Signals transmitted by several adjacent cells have been captured and reported but one cell is clearly predominant since its signal has been reported significantly more often than the others. Finally, the remaining frequencies, i.e. 5 and 7, clearly show behaviours considerably deviating from the ideal case since several cells are reported and a predominant cell does not seem to exist.

The data available at this stage is still not enough to proceed with a satisfactory classification process. It is already possible to identify some of the more interesting frequencies of the BA list, but crucial information is still missing. In fact, when the same BCCH carrier transmitted by several adjacent cells is picked up by a given mobile, it is essential to recognise the planned neighbouring cell amongst them. For example in FIG. 3, mobiles pick up BCCH carriers transmitted by both cells shown in yellow. The cell with BSIC 45 is not a planned neighbour, hence its signal is undesired. On the contrary, the signal produced by the cell with BSIC 44 is welcomed since this cell is the planned neighbour for the BCCH frequency 795.

Identifying the planned neighbouring cells amongst all the adjacent cells reported is a valuable information that can indirectly be derived from the Handover Command (HANDO CMD) message (see GSM 04.08, Version 5.4.0, supra). The HANDO CMD message is sent by the Base Station Controller (BSC) to the mobile to command the mobile to perform the handover. It carries all the relevant information to allow the mobile to switch to the new channel in the new cell. Thus from analysing HANDO CMD messages extracted at the Abis interface of the PLMN, it is possible to build either a complete or a subset of the list of neighbours from which the BA list is derived. This list might not be complete because it could happen that no handover is ever attempted on some adjacent cells, therefore it is not possible to distinguish between planned and unplanned adjacents.

The only piece of information extracted from the HANDO CMD, which is relevant to this methodology, is the Cell Description information element (see GSM 04.08, Version 5.4.0, supra). This is the identification of the target cell and it is given in terms of BCCH/BSIC. Despite not being crucial to the purpose of the classification task, Handover Failure (HANDO FAIL) messages (also see GSM 04.08, Version 5.4.0, supra) are also processed in order to gain supplementary knowledge that might be useful to estimate the effects of neighbouring cell list problems.

The collection and processing of such data results in a table which lists the number of handover attempts and failures for each planned neighbour. Again, these latest values are not strictly necessary to carry out the classification process, but they give additional information to understand effects and causes of neighbouring list problems.

In the hypothetical scenario, the data shown in the table below is the result produced by processing handover messages.

TABLE 2

Data from handover messages

| BCCH | BSIC | Handover attempts | Handover failures |
|---|---|---|---|
| 771 | 44 | 50 | 0 |
| 772 | 40 | 109 | 1 |
| 773 | 47 | 22 | 0 |
| 776 | 40 | 169 | 4 |
| 792 | 42 | 231 | 6 |
| 795 | 44 | 201 | 2 |
| 804 | 45 | 0 | 0 |
| 811 | 42 | 9 | 0 |
| 816 | 40 | 272 | 11 |

At this point, the problem of combing the information produced by the processing of the measurement messages, Table 1, and the processing of handover messages, Table 2, is revealed. Apparently, data in Table 1 and Table 2 does not seem to be related but a peculiar property of the BA list can be used to link these two sets of data. In fact, according to the GSM standard (see GSM 04.08, Version 5.4.0, supra):

The absolute RF channel numbers (ARFCNs) are placed in increasing order of ARFCN, except that ARFCN 0, if included in the set, is put in last position.

Such ordering property together with the matching of BSIC data contained in both tables allows one to link the subset of neighbouring cells with the BA list, as shown in the following table.

TABLE 3

Planned neighbouring cell

| BA Index | BCCH | Planned BSICs |
|---|---|---|
| 0 | 771 | 44 |
| 1 | 772 | 40 |
| 2 | 773 | 47 |
| 3 | 776 | 40 |
| 4 | 792 | 42 |
| 5 | 795 | 44 |
| 6 | 804 | — |
| 7 | 811 | 42 |
| 8 | 816 | 40 |

It has to be pointed out that this mapping process is not such a straight forward process as it might appear since it may be based on handover information that might be incomplete. For example, it is not possible to identify is the planned neighbour for BCCH 804 because no handovers have taken place, as shown in Table 2. A detailed description of this process to build the BA list will follow in section 3.3 below.

3.2 Neighbouring Cell Classification

Figure 4:
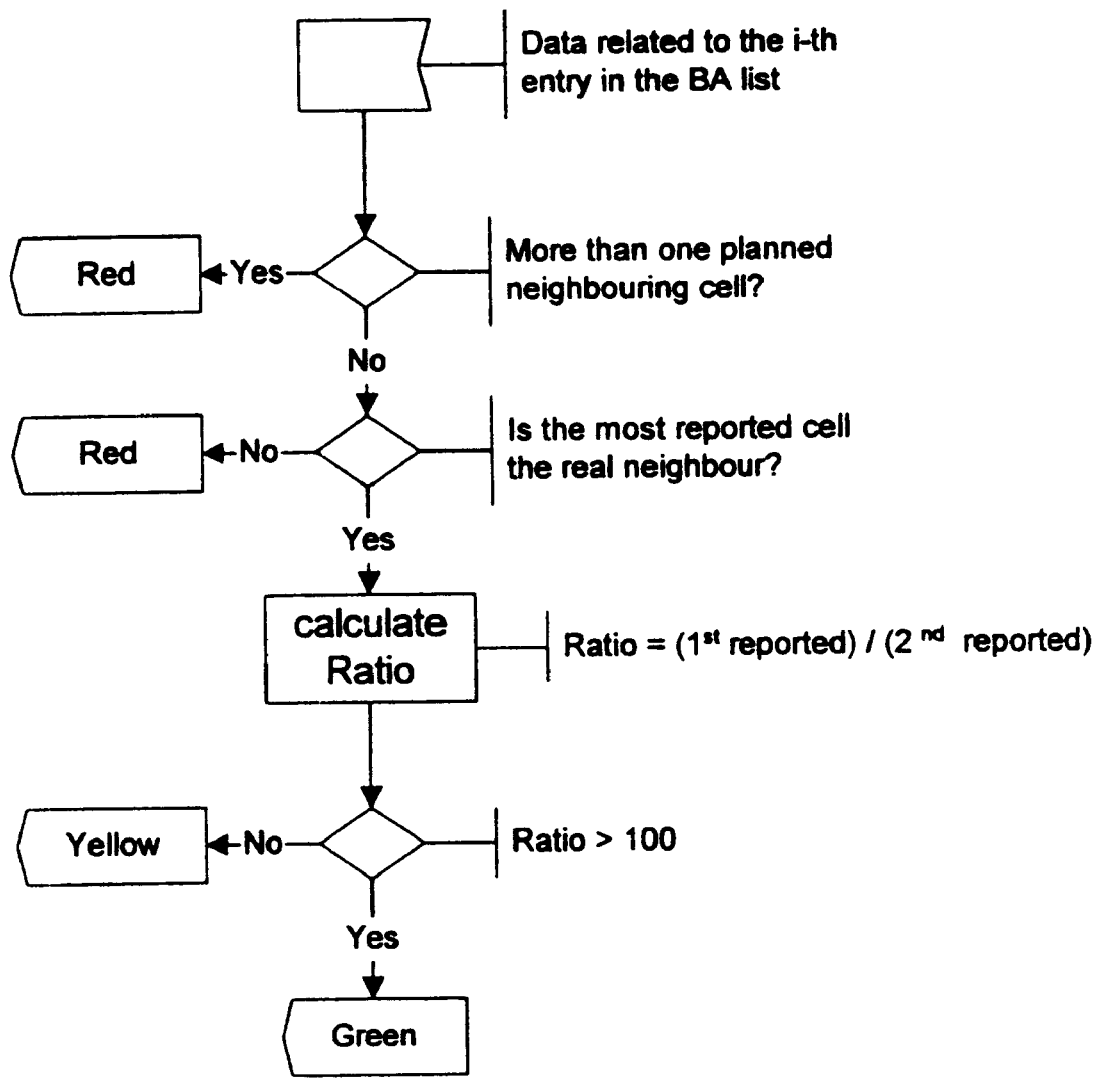
FIG. 4 is a flow diagram of a classification process.

This section contains the description of the classification process. FIG. 4 illustrates the classification process in a pseudo-SDL representation. The process applies only to those frequencies of the BA list on which at least one handover attempt was taken place. In contrast, with regard to those frequencies without handover information, such as BCCH 804 of the previous example, there is not enough information available to proceed with the frequency classification since the BSIC of the planned neighbour is not known.

As shown in FIG. 4, the input of the classification process is the set of data related to one entry of the BA list, namely the set of data extracted from Table 1, Table 2 and Table 3 at a specific row.

Therefore, given a BCCH entry in the BA list, if more than one planned neighbour using that particular BCCH exists, the frequency is classified as red. Generally, these cases might result in co-channel interference and only a particular morphological environment might justify this choice.

If only one planned neighbouring cell exists, further processing takes place. The BSIC of the planned neighbour is compared with the BSIC of the adjacent cell whose signal has been reported more often. If the two BSICs differ, the frequency will be classified as red. For example, in the case of BCCH 811 the planned neighbour has BSIC 42 (see Table 3) but the cell that is actually reported more often has BSIC 43 (see Table 1). Therefore the BCCH 811 is classified as red.

Alternatively, if both BSICs are the same, the next step consists of evaluating the predominance of the planned neighbour compared to the other adjacent cells that use the same BCCH carrier. To realise this, the occurrences of the first two most reported cells are compared. If they differ in by a predetermined amount or ratio, such as at least one or two orders of magnitude (one order of magnitude will be used in this example), this frequency is classified as green otherwise as yellow. Again, the example clarifies this concept. BCCH frequency 795 is classified as yellow since the ratio between the measurement occurrences of the most reported neighbour, i.e. 66335, and the measurement occurrences of the following most reported neighbour, i.e. 11842, is less than ten, which means one order of magnitude. On the other hand, the BCCH frequency 816 is classified as green since the ratio between 63023 and 139 is bigger than ten.

Actually, the choice of two orders of magnitude set to discriminate between green and yellow frequencies is based on the operator input. This depends on the extent to which an operator might consider certain deviating behaviours as the ideal behaviour.

By applying this classification criteria to all the frequencies of this hypothetical scenario, the following table is obtained.

TABLE 4

| | | Classification |
|---|---|---|
| BA index | BCCH | Classification |
| 0 | 771 | Green |
| 1 | 772 | Green |
| 2 | 773 | Green |
| 3 | 776 | Green |
| 4 | 792 | Green |
| 5 | 795 | Yellow |
| 6 | 804 | Blue |
| 7 | 811 | Red |
| 8 | 816 | Green |

Before concluding this section, the fact must be stressed that this classification process has been kept quite simple. This has been done on purpose since the goal of this process is only to spot cases of clear deviation from the ideal behaviour (red cases) and highlight doubtful behaviours (yellow cases). Other information, such as the level of the signal received from the neighbouring cells, might be taken into account by the classification process. At the moment, the neighbouring signal strength is only important in order to provide additional knowledge to operators' planning teams. The advantage of including such information in the classification process is not really clear and to achieve it, a complex expert system might be required.

3.3 BA List Building

This section deals with the problem, raised in section 3.1, of linking together the information produced by the processing of the measurement and handover messages in order to build the BA list and classify each of its entries. Indeed, this is a very complex task since it relies on the ordering property of the BA list (see GSM 04.08, Version 5.4.0, supra) and the matching of a very limited range of BSICs.

The input for this specific process is the list of cells subjected to handover and the list of reported neighbours. In order to explain this process, we refer to these two lists as HoList and NeighRepList respectively. In a nutshell, this process achieves the discovery of the relationships between these two sets of data, i.e. HoList and NeighRepList, in order to determine the value of the BCCH of each element of the BA list.

NeighRepList refers to the cells reported by the measurement results as shown in Table 1. HoList is the ordered list of BCCHs of the cells on which handover has been attempted. Generally, each BCCH is associated with only one BSIC but sometimes it might also be the case that more than one BSIC is associated with the same BCCH. An example of what HoList might look like is shown below.

TABLE 5

| HoList | |
|---|---|
| BCCH | BSICs |
| 771 | 44 |
| 792 | 40 |
| 812 | 47 43 |
| 821 | 41 |
| ... | ... |

Figure 5:
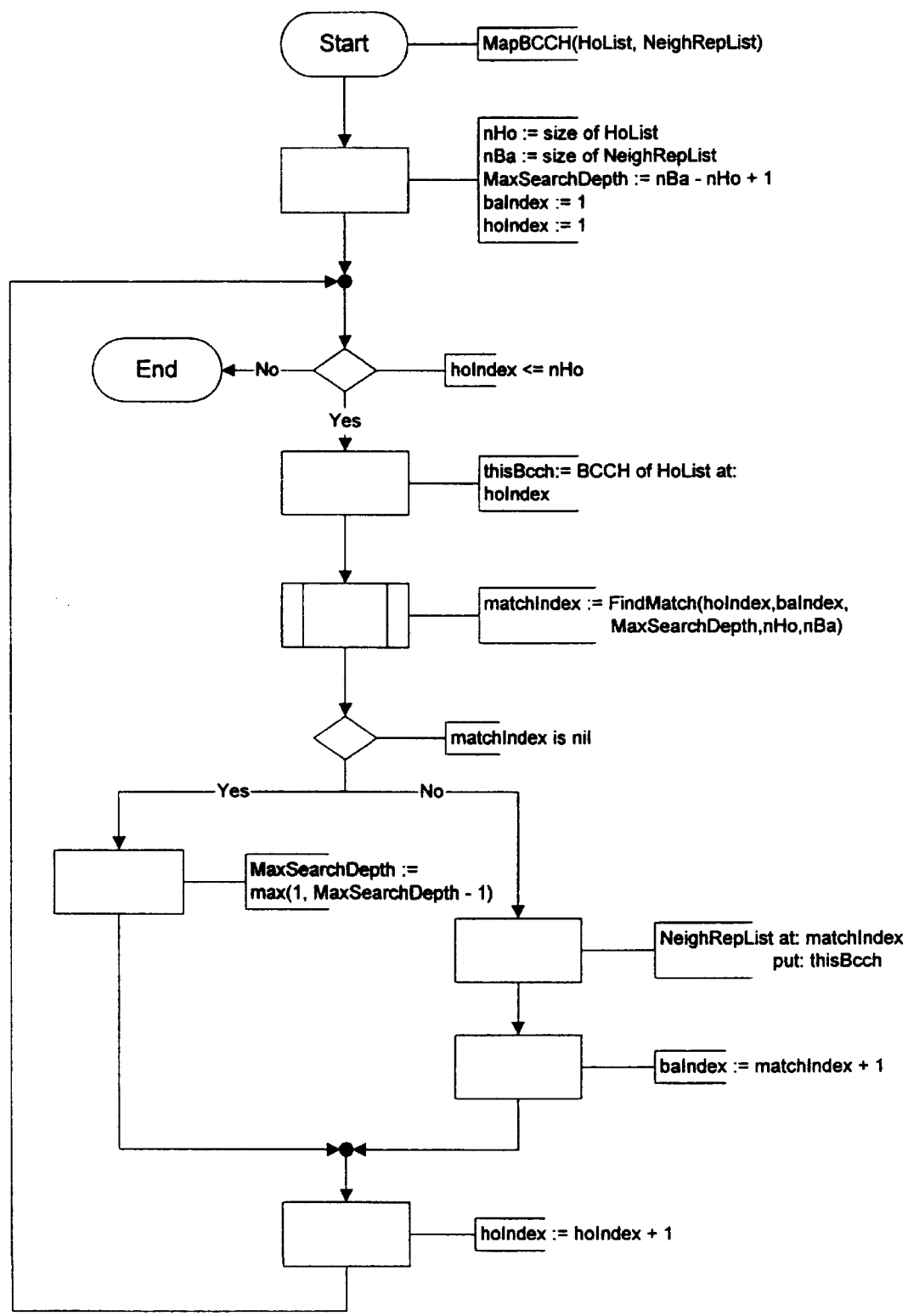
FIG. 5 is a core flow diagram of a process for linking elements in a handover list and elements in a reporting list.
Figure 6:
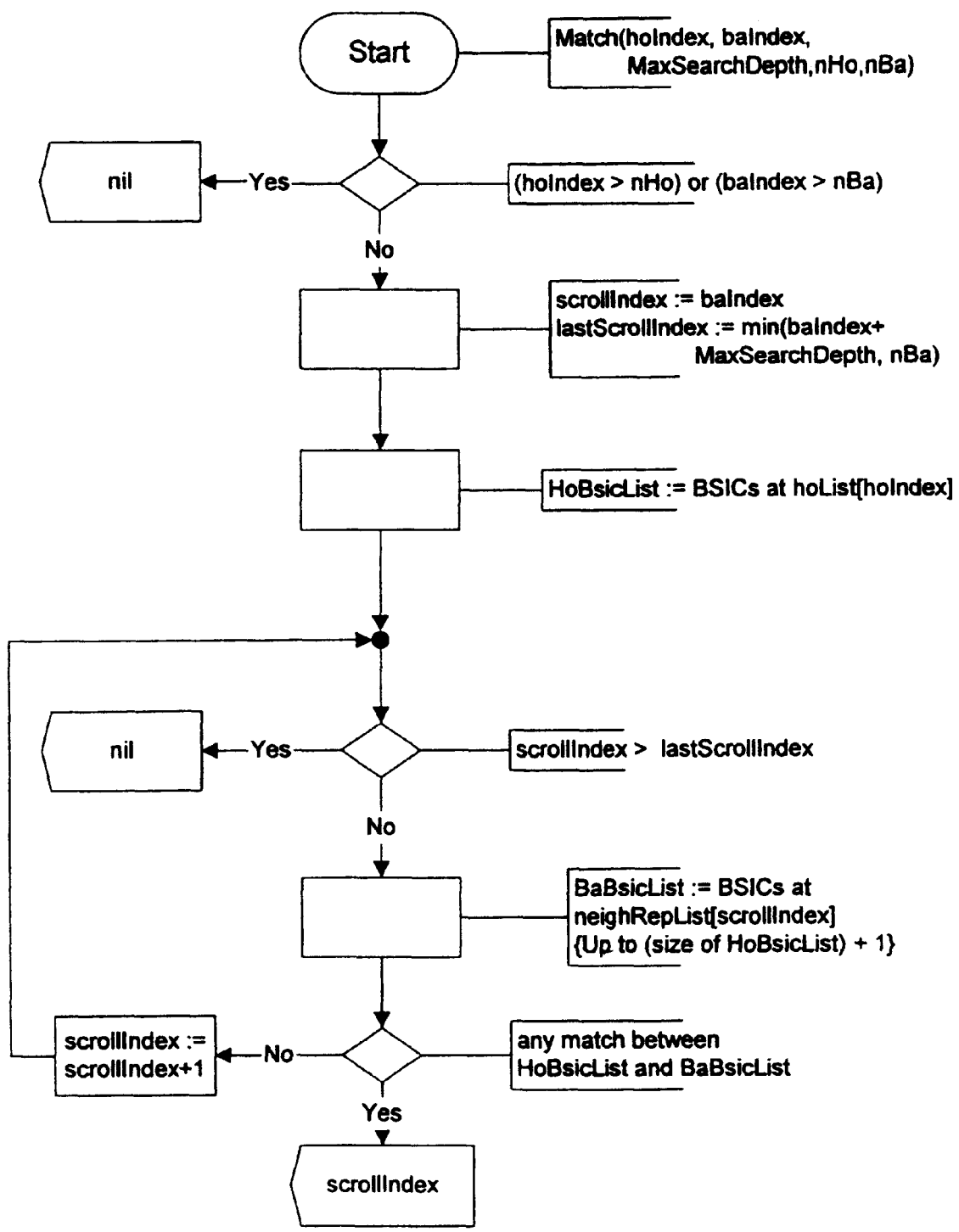
FIG. 6 is a flow diagram showing detail of part of the process of FIG. 5.

The whole process is shown from FIG. 5 to FIG. 8. FIG. 5 shows the core strategy of this process which consists of trying to link each element of HoList with its related element of NeighRepList. Each time NeighRepList is searched in order to find out which element is connected with an element of HoList only a limited number of elements of NeighRepList are examined. The depth of this search is limited by the MaxSearchDepth parameter. This parameter is initialised to the difference of the sizes between NeighRepList and HoList plus one. This initialisation value is decremented by one each time the process fails to link together two elements of HoList and NeighRepList. Anyway, its value cannot be less than one.

As mentioned at the beginning of this section, BCCH values of the BA list are determined by matching BSIC values related to a pair of elements of HoList and NeighRepList. This task is carried out by the function Match shown in FIG. 6. To explain this process, let us assume that this function is called with reference to the $i^{th}$ element of HoList and the $j^{th}$ element of NeighRepList.

Initially, all the BSICs related to $HoList_i$ are extracted and stored in HoBsicList. Only elements of NeighRepList between the $j^{th}$ position and j plus MaxSearchDepth are eventually processed.

When an element of NeighRepList is selected, the list of BSICs related to it are extracted and stored in BaBsicList. Only the BSICs of the most reported cells up to the size of HoBsicList plus one are stored in BaBsicList.

Afterwards, HoBsicList and BaBsicList are compared to check if they have at least one BSIC in common. If this happens, the function will return the index of NeighRepList, i.e. scrollIndex, that has satisfied this examination. Otherwise, after having examined all elements of NeighRepList in the allowed range it will return nil, that is, the function has failed to find any relationship between $HoList_i$ and some of the elements of NeighRepList.

Within a Public Land Mobile Network (PLMN), BSICs can only assume eight different values. Clearly, because of this limited range of values and its reuse, great confidence about the BA list built in such a way cannot be inspired. Additional robustness is achieved by carrying out several checks in order to remove any ambiguity that is contained in the basic matching process.

Once a relationship between two elements of HoList and NeighRepList is determined, some other relationships have to be examined in order to find out if any ambiguous relationship exists. If so, the previously established link between the two elements of HoList and NeighRepList must be discarded.

Figure 7:
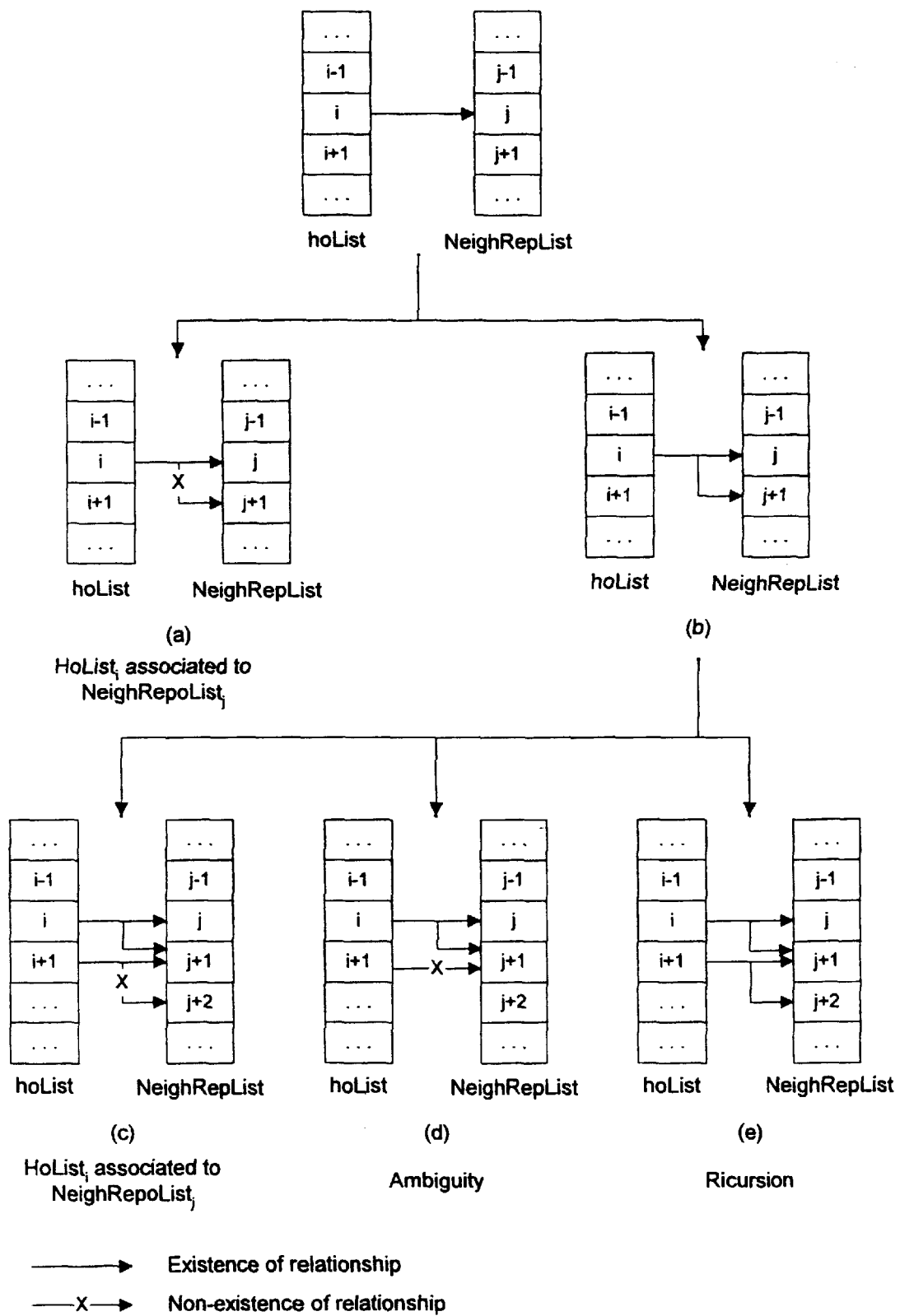
FIG. 7 shows possible relationships that are examined between elements in the handover list and in the reporting list.
Figure 8:
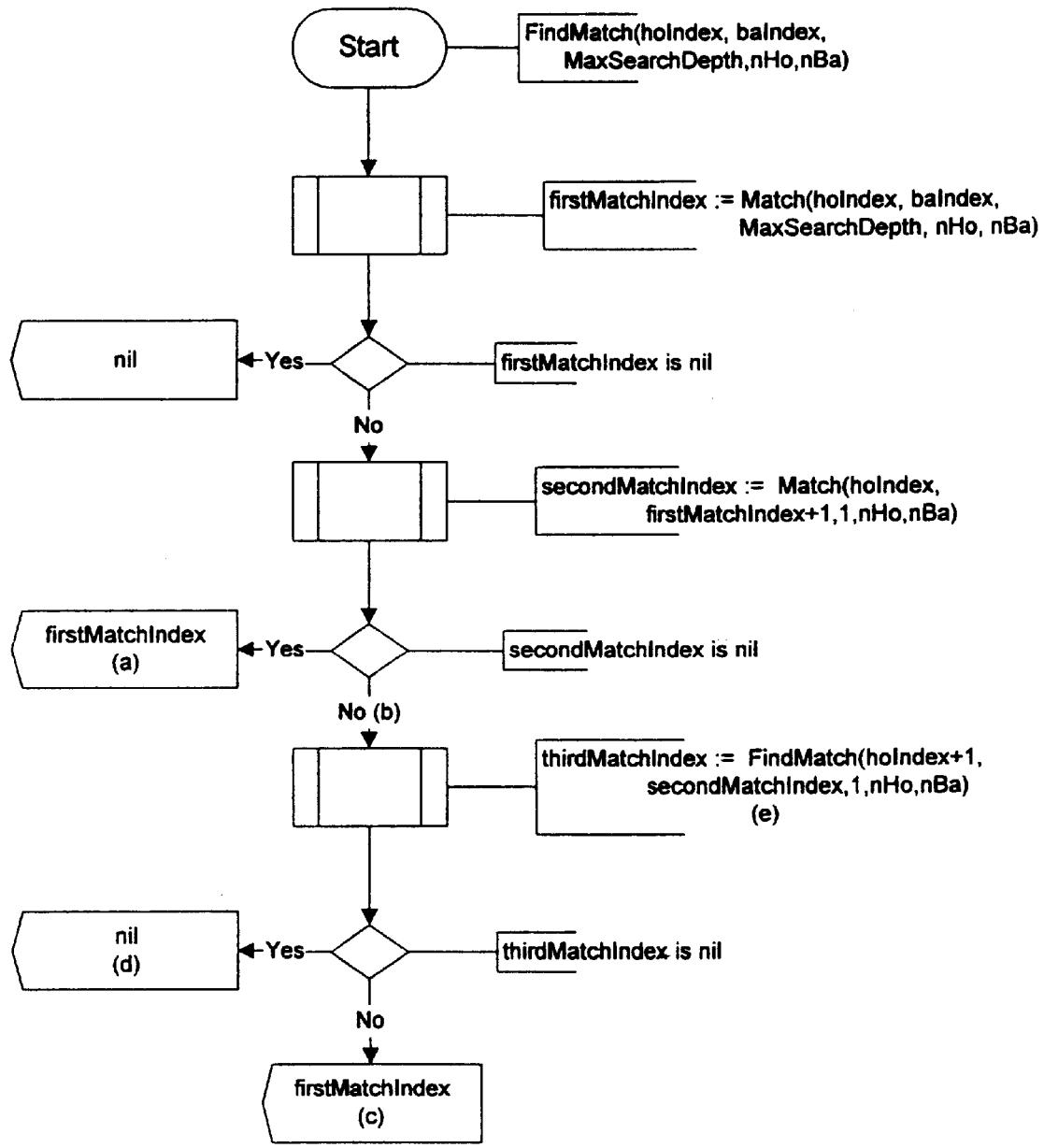
FIG. 8 is a flow diagram of a process which examines the relationships of FIG. 7.

The proposed strategy is displayed in the form of a flow chart in FIG. 8, while FIG. 7 shows all the possible relationships that are examined once two elements, for example $HoList_i$ and $NeighRepList_j$, seem to be linked.

To explain the contents of FIG. 7, let us suppose that the $i^{th}$ entry of HoList is linked to the the $j^{th}$ entry of NeighRepList. At this stage, it has to be checked if $HoList_i$ can also be linked to $NeighRepList_{j+1}$. If this examination fails (case (a)) $HoList_i$ and $NeighRepList_j$ are considered to be linked together. Otherwise, as revealed in case (b), further processing is required because $HoList_i$ can be equally linked to $NeighRepList_j$ and $NeighRepList_{j+1}$. $HoList_{i+1}$ has also to be taken into account and three other cases might occur. First, according to case (c) it can happen that $HoList_{i+1}$ is linked to $NeighRepList_{j+1}$ but not to $NeighRepList_{j+2}$. Therefore, $HoList_i$ is assumed to be linked to $NeighRepList_j$. In contrast case (d) shows that if $HoList_i$ can be equally linked to $NeighRepList_j$ and $NeighRepList_{j+1}$, and $HoList_{i+1}$ cannot be linked to $NeighRepList_{j+1}$, no relationship between $HoList_i$ and $NeighRepList_j$ is assigned since ambiguity has occurred. Finally, case (e) reveals that if $HoList_i$ can be linked to $NeighRepList_j$ and $NeighRepList_{j+1}$, and $HoList_{i+1}$ can be linked both to $NeighRepList_{j+1}$ and $NeighRepList_{j+2}$, the process proceeds recursively until it results in one of the situations described in case (a), (c) or (d).

The process is quite complex but it is important that the BA list is determined correctly since the classification process strongly relies on it. It has also to be observed that in the event that HoList and NeighRepList have the same size or almost the same size, only the implementation of the function Match works well enough to produce correct results.

3.4 Additional Information

As mentioned above, a set of additional data is available to gain a better understanding about the causes of an observed behaviour. The classification process only deals with the number of times the signal from a specific adjacent cell is picked up and reported, but the level of the reported signal is not taken in account at all. However it is quite interesting to observe the level of the signal since it can happen that, although it has been frequently reported, the signal coming from some cells might often be quite low, and this will surely have a negative effect on the handover.

To have a complete picture, another piece of information is still missing: location. The capability of correlating a given set of measurements with the place where mobiles have taken them is extremely valuable as shown later on in section 5. Unfortunately, GSM does not provide any location information, but Timing Advance (TA) (see GSM 05.10, Version 5. 1.0, supra) could be used for this purpose.

TA is the estimated round-trip propagation delay incurred by radio packets from the BTS to mobile and back again. Certainly, whilst this is not a specific location information, the propagation delay is related to the distance of mobiles from the serving BTS. In open space, this is true but elsewhere multipaths increase the overall propagation delay leading to an overestimation of the distance.

Keeping in mind these limitations, TA might be used as a rough information of location. TA is coded in 64 values and each step corresponds to a one-way propagation delay of 24/13 $\mu s$ that is little more than half a kilometer as distance in open space.

3.5 BA List Inconsistencies

The existence of two BA lists, i.e. BA(BCCH) and BA(SACCH), and the handover procedure increase the complexity of the data gathering phase. At the transition from idle to dedicated mode, a certain amount of time elapses before the mobile gets the BA(SACCH) list. In the meantime measurements are based on the BA(BCCH) list, which might be different from the BA(SACCH)list , see section 2.1.1 above.

In the case of handovers, measurements might refer to a BA list that is different from the BA(SACCH) of the serving cell. In fact, when the mobile switches to the new channel in the new cell, the new BA(SACCH) list will be available to the mobile only after a certain amount of time. Meanwhile, measurements are based on the previous BA list.

Another case when neighbouring cell measurements might refer to a BA list different from the one of the serving cell might occur during handover failures when the mobile comes back to the old channel in the old cell.

All these cases highlight the existences of certain time intervals when mobiles might report measurements referring to a BA list that is different from the BA(SACCH) list of the serving cell. This is a serious problem, since, as mentioned in section 2.1.1 above, the MEAS REPORT message does not carry the frequency number of the BCCH carrier reported; instead it carries the position of the BCCH carrier in the BA(SACCH) list. Consequently, in the case mobiles use two or more BA lists, it is likely that measurements referring to the same value of BCCH_FREQ_NCELL are actually referring to different BCCH carriers. Therefore, all these cases where neighbouring cell measurements might refer to BA lists different from the BA(SACCH) of the serving cell must be captured in order to discard such measurements. This is achieved by having a Finite State Machine (FSM) for each radio channel.

Each FSM will keep track of all the above mentioned periods of time when neighbouring cell measurements might not refer to the BA(SACCH) of the serving cell. On the occurrence of one of these cases, a certain number of following measurement messages will be discarded. The number of measurement messages to discard is closely related to the average time that might elapse between the acknowledgement of the radio link and the first message sent to the mobile over the SACCH carrying the BA(SACCH) list that it must use. Actually, the number of measurement messages to skip has been assigned differently and specifically to each case of likely BA inconsistencies captured by this FSM.

Before describing this FSM, it is mentioned that this FSM should be as much simple as possible since it is not proposable to have a processing system that requires as much complexity as the BSC does.

3.6 Finite State Machine

The FSM processes only signalling messages of the Abis interface. It only keeps track of allocations and releases of radio channels, handover attempts and failures, and acknowledgements of the establishment of the radio link. In particular, the last event is strictly related to states where measurements might not refer to the BA(SACCH) list of the serving cell.

Data extracted from measurement and handover messages are stored on a cell basis, regardless of the specific connection, but some other information must be temporarily stored during the lifetime of a connection. For this purpose, a so-called connection record is created as soon as a radio channel is allocated. This connection record contains the reason of the channel activation, i.e. Activation Type information element (see GSM 08.58, Version 5.2.0, Supra) carried by the Channel Activation (CHAN ACTIV) message (see GSM 08.58, Version 5.2.0, Supra).

It also contains a counter, referred as measCounter, that records the number of the measurement messages received since the receipt of the latest Establish Indication (EST IND) message (see GSM 08.58, Version 5.2.0, Supra). This counter allows the discarding of the measurement messages that have been received too close in time to the establishment of the radio link.

The closeness to the establishment of the radio link is defined through a variable called measToSkip. It defines the value that measCounter must assume before starting to process neighbouring cell data from measurement messages. During the lifetime of a connection, the value of measToSkip is set on receipt of each EST IND messages. For allocation not related to handovers, measToSkip takes the value two. In all other case, it takes the value four.

Finally, in the connection record, lastBCCH and lastBSIC are used to store the BCCH and the BSIC of the target cell of the latest handover attempt. Storing the BCCH and the BSIC of the latest handover attempt is also needed to know to which cell the handover eventually failed, since the message that notifies such a failure, i.e. Handover Failure (HANDO FAIL) message (see GSM 04.08, Version 5.4.0, supra), does not carry the identification of the target cell. The receipt of a HANDO FAIL message will also cause the reset of lastBCCH and lastBSIC.

Figure 9:
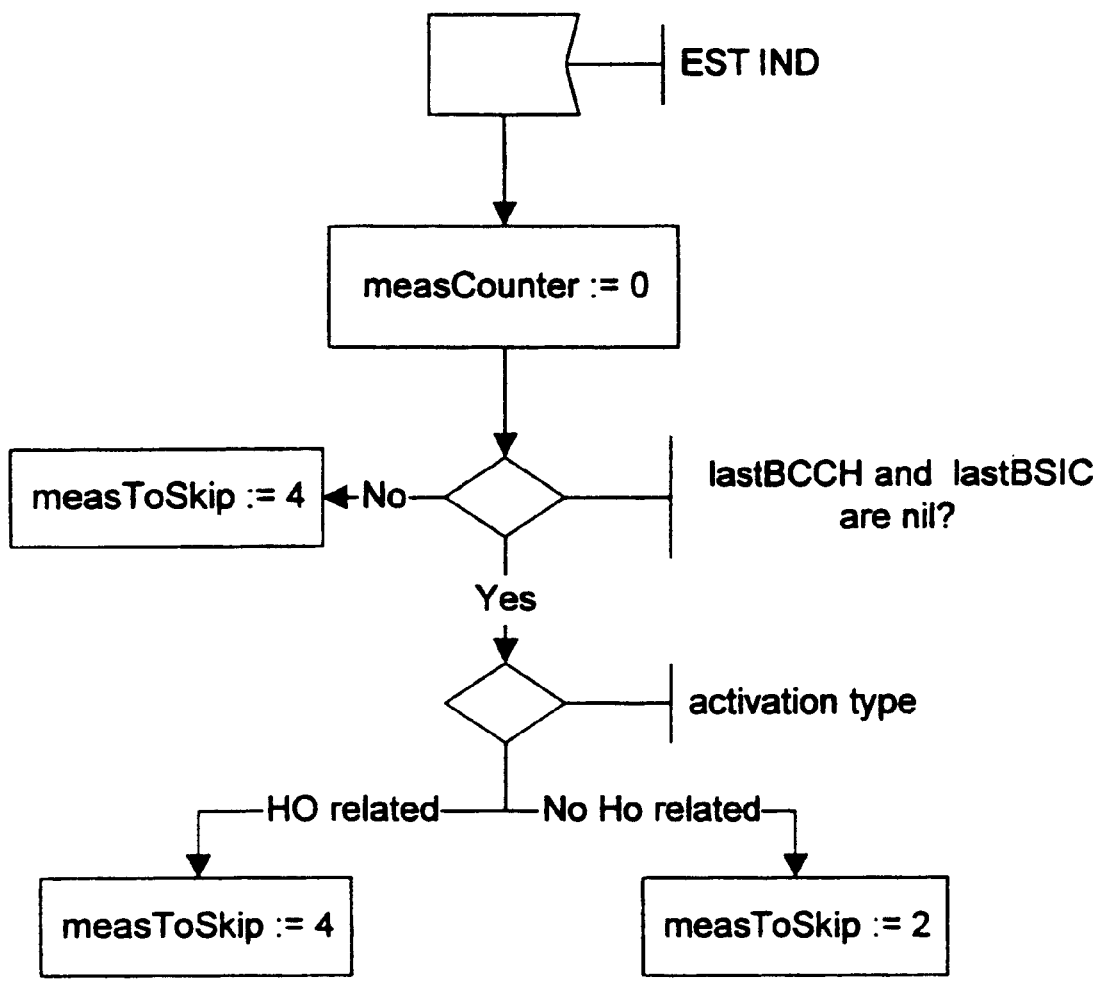
FIG. 9 is a flow diagram of a process which is employed when a mobile station becomes active or is handed over.

FIG. 9 shows schematically how the value of measToSkip is assigned on receipt of the EST IND message.

Figure 10:
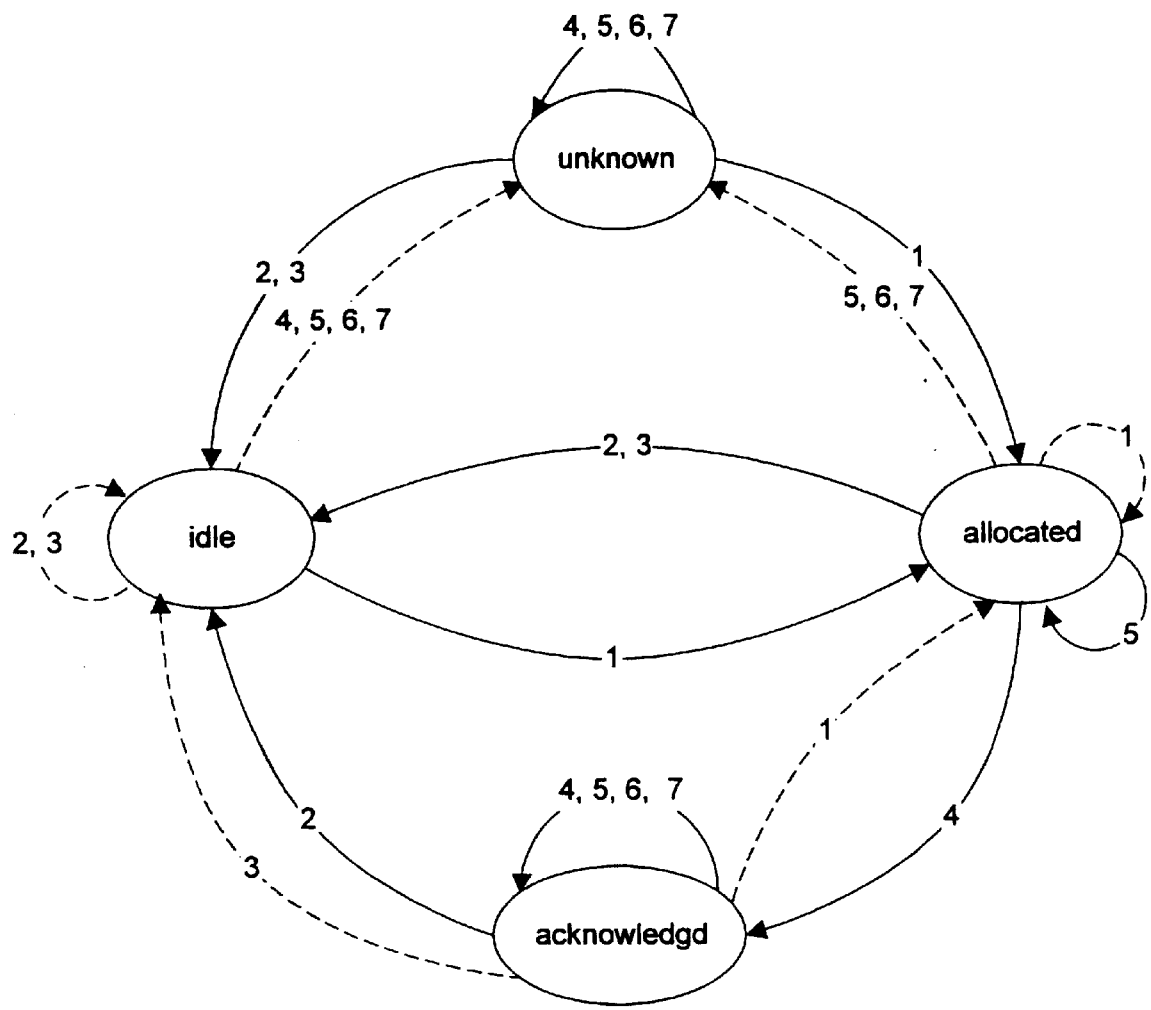
FIG. 10 illustrates a finite state machine employed for each radio channel.

FIG. 10 shows the proposed FSM. It relates to a single radio channel and consists of four states: allocated, acknowledged, idle and unknown. The signalling messages used are seven; more precisely: CHANnel ACTiVation, RF CHANnel RELease, CHANnel ACTIVation Negative ACKnowledge, ESTablish INDication, MEASurement RESult, DATA REQuest, and DATA INDication (see GSM 08.58, Version 5.2.0, Supra). Actually, only DATA REQ carrying HANDOver CoMmanD and DATA IND carrying HANDOver FAILure messages (see GSM 04.08, Version 5.4.0, supra) are relevant to this FSM.

In the FSM, a certain number of transitions are marked as abnormal. They have been put in place to handle cases of protocol errors or losses in the stream of signalling messages that feeds the FSM. In the case of an abnormal transition, it might be useful to store both the message that had triggered the transition and the FSM state for further analysis.

3.6.1 Allocated State

The transition to this state corresponds to the request for allocating a radio channel. This transition is triggered by the receipt of the CHAN ACTIV message. The only action related to this state is the creation and initialisation of the connection record that refers to this radio channel. The CHAN ACTIV's Activation Type information element (see GSM 08.58, Version 5.2.0, supra) is extracted and stored in the connection record.

In this state, the EST IND message, which acknowledges the establishment of the radio link between the mobile and the network, is normally expected and its receipt triggers the change to the acknowledged state.

Either RF CHAN REL or CHAN ACTIV NACK message causes the transition to the idle state and the consequent discard of the data stored in the connection record.

The receipts of DATA REQ and DATA IND messages, and MEAS RES messages carrying downlink measurements, relate to illegal transition and the FSM changes its state to unknown.

The receipt of MEAS RES messages carrying only uplink measurements is perfectly possible and these message are not processed since they do not contain any neighbouring cell measurements.

Finally, the receipt of the CHAN ACTIV message is something abnormal that does not trigger a change of the FSM. The connection record currently used will be discarded and a new one will be created, as the connection would have started at this moment.

3.6.2 Acknowledged State

The acknowledgement of the establishment of the radio link between the mobile and the network, reported by the EST IND message, triggers the transition to the acknowledged state.

As soon as the FSM moves to this state, measCounter is set to zero. Subsequent receipts of MEAS RES messages cause the value of measCounter to be incremented by one of. MEAS RES messages received in this state are processed only if the value of measCounter is greater than the number of measurement messages to skip, i.e. measToSkip.

On receipt of DATA REQ messages carrying HANDO CMD, the BCCH and BSIC of the target cell are stored in the connection record as lastBCCH and lastBSIC. Such information is valuable to build the list of handover attempts as well as the list of handover failures, since the HANDO FAIL message does not carry the identification of the target cell. At the same time, on a cell basis, the list of cells where handovers are attempted is updated because such information is used later for the frequency classification.

On receipt of the HANDO FAIL message, the value of lastBCCH and lastBSIC is examined to determine the cell to which the handover failed. Again, on a cell basis, the list of cells where handovers failed is updated and the number of handover failures is also stored.

Further receipts of EST IND messages set the value of measCounter to zero. The value of MeasToSkip is also updated according to the description given in section 3.6 and FIG. 1.

RF CHAN REL and CHAN ACTIV NACK messages will trigger the transition to the idle state and consequent discard of the connection record. The receipt of the CHAN ACTIV message is related to an abnormal event. The connection record is discarded and a new one will be created. The FSM's new state will be allocated.

3.6.3 Idle State

A radio channel in this state is not currently used. The transition to this state is always triggered by the RF CHAN REL or CHAN ACTIV NACK message. On entering this state, the related connection record is discarded. The FSM leaves this state and moves to the allocated state only on receipt of the CHAN ACTIV message.

Receipt of any other messages is related to an abnormal transition and, with the only exception of RF CHAN REL and CHAN ACTIV NACK messages, the new FSM state will be unknown.

3.6.4 Unknown State

This state has been introduced to handle abnormal events that could occur when an unexpected message is received in a specific state. These events are mainly due to protocol errors or to losses of messages in the input stream that feeds the FSM.

As earlier mentioned, not all the abnormal events trigger a transition to the unknown state. In fact, sometimes the state of the connection is well known after an abnormal event, such as on receipt of the RF CHAN REL message in the idle state.

3.7 Defective Mobiles

The FSM, described in section 3.6, has been introduced to handle the problem of measurements that contain references to a BA list different from the one of the serving cell. Nevertheless, on a very small scale, neighbours not related to the current BA list are still reported. As a consequence, the BA list determined by the processing of measurement messages might be different from the real one. Table 6 lists the sizes of the real BA lists, the size of the BA lists determined by the proposed process, and finally the differences in size between these two lists.

TABLE 6

Differences in the BA lists

| Cell Name | Real BA list size | Determined BA list size | Difference |
|---|---|---|---|
| Cell01A | 18 | 19 | 1 |
| Cell01B | 20 | 20 | 0 |
| Cell01C | 12 | 16 | 4 |
| Cell02A | 17 | 18 | 1 |
| Cell02B | 16 | 17 | 1 |
| Cell02C | 15 | 17 | 2 |
| Cell03A | 8 | 10 | 2 |
| Cell03B | 9 | 10 | 1 |
| Cell03C | 5 | 6 | 1 |

Table 6 reveals slight differences except in the case of Cell01C where the difference is considerable. These results might put the validity of such an application in doubt. However, a deeper examination of the data reveals an opposing aspect.

With regard to those elements of the BA list that do not exist in reality, i.e. the elements from index 11 to 15 in Table 7, a close examination of the number of measurements processed for each reported BCCH reveals two interesting characteristics.

TABLE 7

| | Cell01C | | |
|---|---|---|---|
| BA Index | BCCH | # Reported | Real BA |
| 0 | 771 | 38692 | Yes |
| 1 | 773 | 50186 | Yes |
| 2 | 776 | 8177 | Yes |
| 3 | 792 | 284421 | Yes |
| 4 | 796 | 198120 | Yes |
| 5 | 799 | 101642 | Yes |
| 6 | 804 | 65948 | Yes |
| 7 | 809 | 244485 | Yes |
| 8 | 811 | 221125 | Yes |
| 9 | 842 | 372188 | Yes |
| 10 | 843 | 37018 | Yes |
| 11 | 846 | 37018 | Yes |
| 12 | — | 119 | No |
| 13 | — | 1 | No |
| 14 | — | 2 | No |
| 15 | — | 1 | No |

First of all, for these elements no handover will never take places since they do not exist in reality. Therefore, the will always be classified as blue frequencies. Secondly, the number of times they are reported is always very small compared to the other real entries. This might lead to the conclusion that such entries of the BA list must be removed.

However, the two previous characteristics are not only peculiar to false BA list entries. The example in Table 8 shows two elements, at the index 13 and 14, that have the two Mentioned characteristics but still belong to the real BA list.

TABLE 8

| | Cell02C | | |
|---|---|---|---|
| BA Index | BCCH | # Reported | Real BA |
| 0 | 773 | 403 | Yes |
| 1 | 796 | 433507 | Yes |
| 2 | 807 | 167949 | Yes |

TABLE 8-continued

Cell02C

| BA Index | BCCH | # Reported | Real BA |
|---|---|---|---|
| 3 | 811 | 591364 | Yes |
| 4 | 816 | 339610 | Yes |
| 5 | 819 | 48098 | Yes |
| 6 | 820 | 56935 | Yes |
| 7 | 825 | 557497 | Yes |
| 8 | 836 | 64892 | Yes |
| 9 | 842 | 506801 | Yes |
| 10 | 843 | 317038 | Yes |
| 11 | 848 | 15791 | Yes |
| 12 | 852 | 301921 | Yes |
| 13 | — | 163 | Yes |
| 14 | — | 2 | Yes |
| 15 | — | 0 | No |
| 16 | — | 2 | No |

Consequently, an extensive protocol analysis had to be carried out with the intent to identify those measurements that refer to a BA list which is different from the one of the several cell. First of all several connections with measurement messages carrying BCCH_FREQ_NCELL values outside the allowed range of the BA lists of the serving Cells are located. Afterwords, the signalling for such connections was extracted and examined using a protocol analyser.

All these connections show common characteristic of being established in relation to asynchronous handover. In most of them the BCCHs not belonging to the BA list of the serving cell were reported in the first or second measurements. This was the expected behaviour, which the FSM was designed to handle. In a few other cases, the BCCH_FREQ_NCELL values not referring to the BA list of the current cell were also Reported after a few seconds from the establishment of the radio link. Such long time Interval was inexplicable. The whole signalling referring to one of these cases is Presented below.

| Direction | Message |
|---|---|
| BTS ← BSC | Channel Activation |
| BTS → BSC | Channel Activation Acknowledge |
| BTS → BSC | Handover Detect |
| BTS → BSC | Establish Indication (SAPI 0) |
| BTS → BSC | Data Indication (Handover Complete) |
| BTS ← BSC | Establish Request (SAPI 3) |
| BTS → BSC | Measurement Result (#0) |
| BTS → BSC | Establish Confirm (SAPI 3) |
| BTS ← BSC | Data Request (SMS) |
| BTS → BSC | Measurement Result (#1; 2$^{nd}$ Neighbour wrong) |
| BTS → BSC | Data Indication (Disconnect) |
| BTS ← BSC | Data Request (Release) |
| BTS → BSC | Measurement Result (#2; L1 Info; not Measurement Report) |
| BTS → BSC | Data Indication (Release Complete) |
| BTS → BSC | Measurement Result (#3; 2$^{nd}$ Neighbour wrong) |
| BTS → BSC | Measurement Result (#4; L1 Info; not Measurement Report) |
| BTS → BSC | Data Indication (SMS) |
| BTS → BSC | Measurement Result (#5; 2$^{nd}$ Neighbour wrong) |
| BTS → BSC | Measurement Result (#6; L1 Info; not Measurement Report) |
| BTS → BSC | Data Indication (SMS) |
| BTS ← BSC | Data Request (SMS) |
| BTS → BSC | Measurement Result (#7; 2$^{nd}$ Neighbour wrong) |
| BTS ← BSC | Data Request (Channel Release) |
| BTS → BSC | Deactivate SACCH |
| BTS → BSC | Release Indication |
| BTS ← BSC | RF Channel Release |
| BTS → BSC | RF Channel Release Acknowledge |

The examination of this signalling does not show any peculiar signs that might highlight the presence of mobiles which report BA lists not different from the one of the serving cell. It has also to be observed that no BCCH INFOrmation or SACCH FILLing messages (see GSM 08.58, Version 5.2.0, Supra) has been sent, and these are the messages that inform the BTS to change its configuration, such as its BA list.

After this investigation it can be concluded that such a phenomenon is characteristic of mobiles that do not properly update the BA list they use for reporting measurements of neighbouring cells.

Finally, measurements that refer to a BA list different from the one of the serving cell can only be identified if they have a BCCH_FREQ_NCELL bigger than the size of the real BA list itself. In the other cases of a BCCH_FREQ_NCELL value within the size of the real BA list it is not possible to distinguish the measurements that do not refer to the BA list of the serving cell.

Anyway, the FSM is able to remove the largest part of these doubtful measurements while it retains only a small amount of them which does not affect the results of the classification and the validity of the application.

3.8 Scalability

This section analyses some of the memory requirements related to the use of this application over a large number of cells. On a cell basis, the data stored to carry out the classification of the BA list consists of several counters to record handover attempts and failures, and the number of times adjacent cells have been reported. The number of these counters is directly proportional to the size of the BA list itself. For example, in the case of a cell with a long BA list, let us suppose twenty entries, on average, no more than one hundred counters are necessary. In fact, around forty counters will be used to record handover attempts and failures; the remaining sixty counters will record adjacent cell measurements. This number of counters is based on the assumption that, on average, three different cells are reported for each of the BCCH of the BA list. Running such ananalysis on a BSC site, which usually deals with less than one hundred cells, does not cause any major memory problem.

Scalability becomes a serious issue as soon as the additional information mentioned in section 3.4 above. In this case, neighbouring cell measurements are discriminated and recorded according to the value of the frequency they refer to, i.e. BCCH_FREQ_NCELL, to the value of the BSIC, i.e. BSIC_NCELL, to the value of the signal strength, i.e. RXLEV_NCELL, and finally to the value of TA.

Clearly, we are dealing with a four-dimensional data space since each quadruple uniquely identifies a counter, which is incremented by one every time a neighbouring cell measurement that refers to it is processed. The complete address space of this four-dimensional space and therefore the number of counters required on a cell basis is huge. BCCH_FREQ_NCELL may assume 32 different values; within a PLMN BSIC_NCELL may vary amongst a range of eight values; RXLEV_NCELL is sampled into 64 values as well as TA. So that, one single cell might require 1,048,576 counters, that is 32×8×64×64. Consequently, this requirement might already compromise the capacity of running the BA list classification over a few cells.

Actually, this four-dimensional space is very low populated and the result of an investigation, carried out over nine cells, shows that the number of counters not nil is considerable small (see Table 9).

TABLE 9

Counter population

| Cell Name | TRXs | BA list entries | Not nil counters | % |
|---|---|---|---|---|
| Cell01A | 2 | 18 | 11680 | 1.11% |
| Cell01B | 2 | 20 | 10222 | 0.97% |
| Cell01C | 2 | 12 | 6220 | 0.59% |
| Cell02A | 2 | 17 | 7342 | 0.70% |
| Cell02B | 2 | 16 | 9049 | 0.86% |
| Cell02C | 2 | 15 | 4471 | 0.43% |
| Cell03A | 1 | 8 | 4121 | 0.39% |
| Cell03B | 1 | 9 | 1536 | 0.15% |
| Cell03C | 1 | 5 | 2588 | 0.25% |

Furthermore, the number of required counters could be reduced by grouping together some of the values of TA and the signal strength. The values of the signal strength, i.e. RXLEV_NCELL, have been further sampled by grouping them in only four bands, as shown in Table 10.

TABLE 10

Signal strength bands

| RX Band | Range of RxLev | Range RXLEV NCELL |
|---|---|---|
| $1^{st}$ | $-81$ dBm $\leq$ RxLev | [63, 30] |
| $2^{nd}$ | $-85$ dBm $\leq$ RxLev $\leq -82$ dBm | [29, 26] |
| $3^{rd}$ | $-92$ dBm $\leq$ RxLev $\leq -86$ dBm | [25, 19] |
| $4^{th}$ | RxLev $\leq -93$ dBm | [18, 0] |

The improvement obtained by grouping the signal strength in such a way is substantial as shown by the results in Table 11.

TABLE 11

Reduced counter population

| Cell Name | TRXs | BA list entries | Not nil counters | % |
|---|---|---|---|---|
| Cell01A | 2 | 18 | 1478 | 0.14% |
| Cell01B | 2 | 20 | 1440 | 0.14% |
| Cell01C | 2 | 12 | 716 | 0.07% |
| Cell02A | 2 | 17 | 837 | 0.08% |
| Cell02B | 2 | 16 | 1193 | 0.11% |
| Cell02C | 2 | 15 | 485 | 0.05% |
| Cell03A | 1 | 8 | 540 | 0.05% |
| Cell03B | 1 | 9 | 202 | 0.02% |
| Cell03C | 1 | 5 | 305 | 0.03% |

A similar approach might also be used for the values of TA. They could be grouped in a linear fashion by spreading groups equally, such as groups of two or four TAs. Alternatively, a more sophisticated grouping could be established by having a fine granularity for small values of TA and a rough granularity for larger values of TA. This further data reduction has not been applied or investigated since the reduction on the number of counters already achieved is satisfactory.

The way in which the data is structured is such that the amount of data being stored is not strictly dependent on how much signalling is processed. After a certain time transitory the number of counters created by the application does not grow any longer. This behaviour is easily explainable due to the fact that after a certain amount of time mobiles have reported almost all the range of values in terms of signal strengths, neighbouring BCCH carriers and so on, which are typical of a specific cell. Actually, with the passing of time, the values of the counters already in use are incremented since more and more signalling is processed and only sometimes a new counter is added. This transitory period can be safely evaluated in one whole day since in this way it is possible to cover the typical user flow. This characteristic allows the processing of several days of signalling without regarding memory requirements.

Finally, from the data in Table 9 and Table 11 it is evident that the number of counters required for each cell is not strictly proportional to the size of the BA list itself. Rather, it is related to the type of cell, its extension and so on. This statement can be easily verified by dividing the number of counters not nil by the size of the BA list in both Table 9 and Table 11.

4 VISUALISATION

The value of an application is also measured by the quality of the output it provides. Any overflow of data must be strongly avoided; only relevant data must be accessible. Data accessibility is also another important aspect to keep in mind. Data must be easy to access and the navigation through the data must also be as intuitive as possible.

During the design of the GUI of this application these aspects were considered and the result is a set of GUIs that aims to:

guide the user to identify where the problem occurs in the network;

present more in-depth data to understand the cause of the problem.

Figure 11:
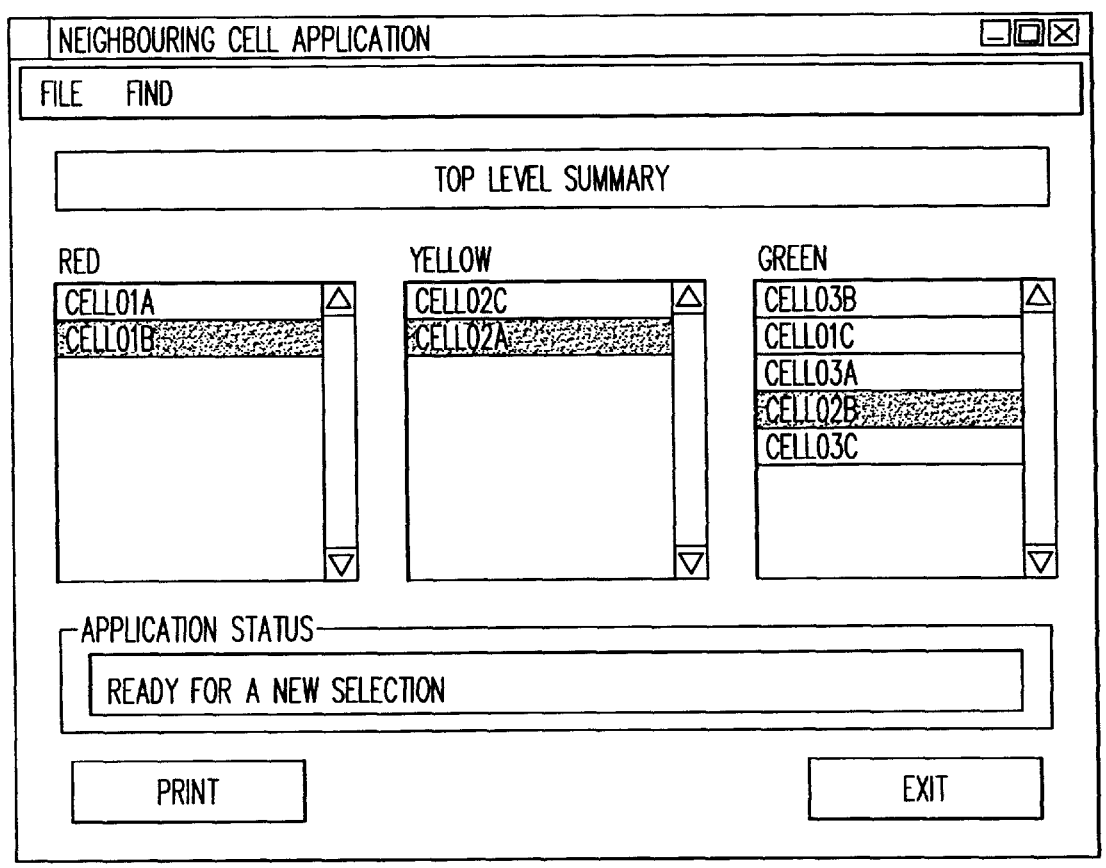
FIG. 11 is an example of a graphical user interface window for presenting the results of the process to a user.

Initially, the application shows where the problems related to frequency planning are located in the network being monitored. This is achieved by showing three separate lists (see FIG. 11). The first list is named Red and it contains those cells where the BA list contains at least one frequency that has been classified in red while the second list, i.e. Yellow, contains those cells that have frequencies classified in yellow but not in red. Finally, the Green list contains cells without red or yellow frequencies. Blue frequencies are not taken into account at all since, as mentioned in section 3.7, it is not possible to be absolutely confident about their correct belonging to the BA list. Each list is also ordered, showing first the cells highly affected by frequency planning problems.

Having identified the cells affected by bad frequency planning, the next step consists of identifying the frequencies of the BA list affected by such bad frequency planning within a cell. After having selected one cell from the top level summary view another window pops up. This window, shown in FIG. 12, contains the BA of the selected cell. Each element of the BA list is coloured according to its classification. Some other additional data is also presented, such as the total number of measurement processed and the list of planned neighbours.

At this stage, the operator knows where problems occur in the network since both the cells and the frequencies affected by planning problems are localised. Subsequently, the operator wants to know as many details as possible in order to understand the cause of the problems so that they can be quickly solved.

Figure 13:
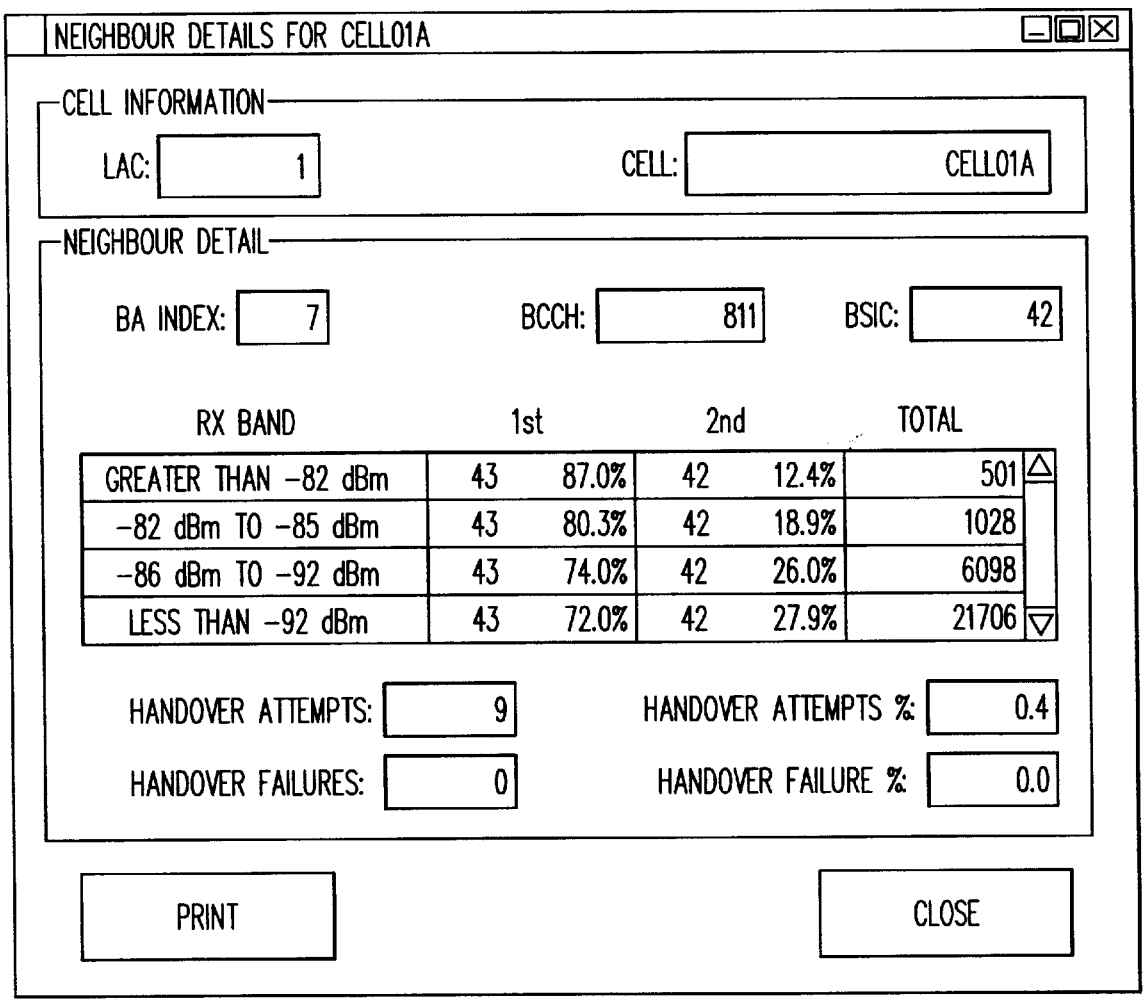
FIG. 13 is a window for a particular selected frequency of a particular selected cell.

By selecting any frequency of the BA list, other windows pop up. The first one, shown in FIG. 13, illustrates some data regarding the number of handover attempts and failures, and, more importantly, with regard to the two strongest neighbours, several values of the signal strength. Each row in the table contains the range of signal strength take into account, the BSICs of the two most reported cells together with the percentage of measurements that reported them.

Finally, the total number of measurements processed is also displayed to give an idea about the significance of the data.

In this table, the data referring to the planned neighbouring cell is coloured according to the classification of the related frequency in the BA list. This is a very effective way to quickly spot the set of data that refers to the planned neighbour.

Figure 14:
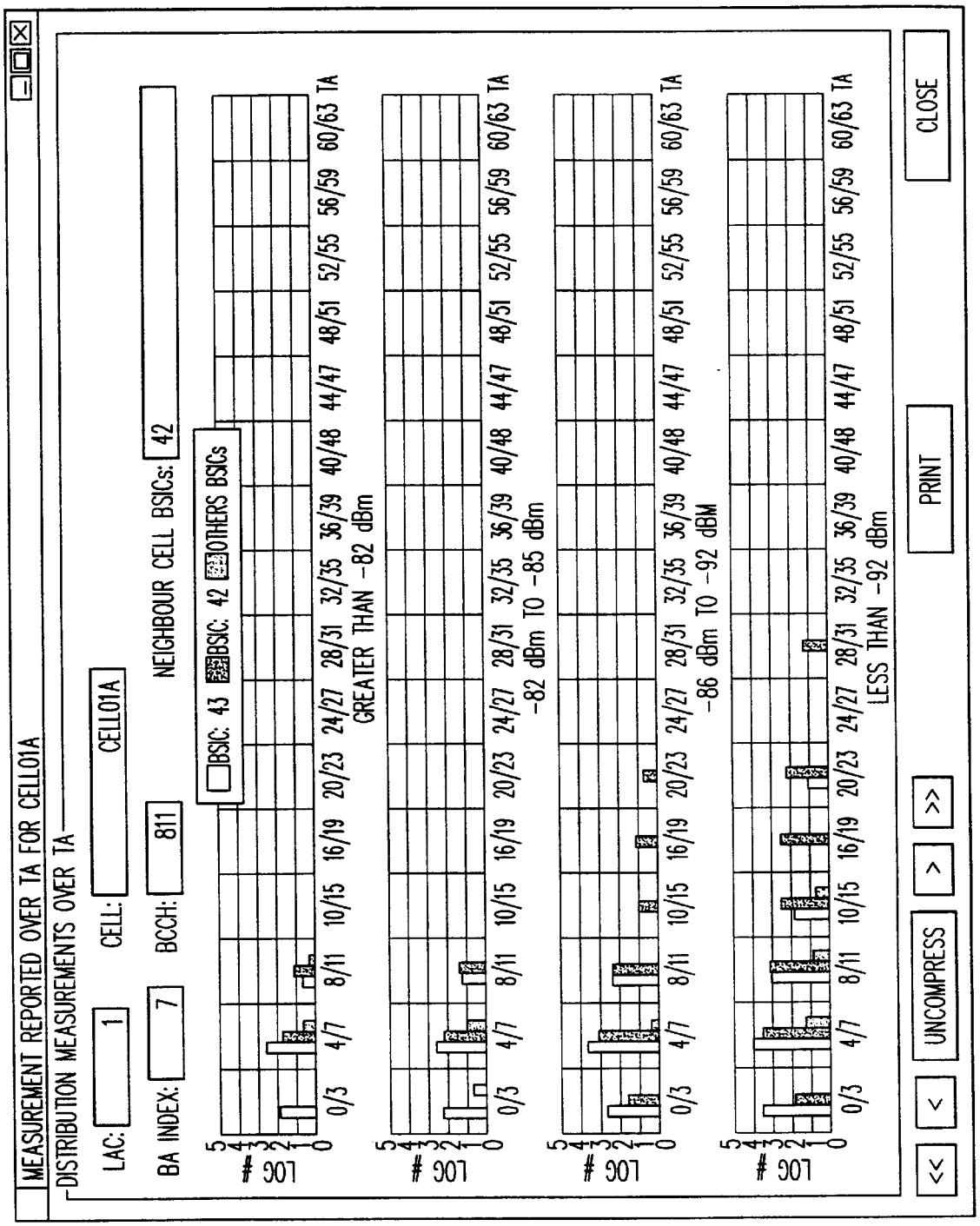
FIG. 14 is an alternative view of the window of FIG. 13.

The additional information of TA is taken into account in the window shown in FIG. 14, which displays the distribution of the measurements according to the value of the signal strength and the TA. These graphs give a rough estimation of the distance of the mobiles from the BTS at the moment the measurements have been taken. This is an extremely valuable information together with the cell RF predictions it can really help to identify what the cause of the problem.

Each graph refers to a specific range of signal strength and it shows the measurement of the two most reported cells, in practice in first and second colours. The third bars (in practice in a third colour) combine the data all the other cells eventually reported.

In conclusion, the output given by this application is of two types. The first one guides the operator to the localisation of frequency planning problems in the network while the second type of output aims at an effective way of revealing the effects of such bad frequency planning.

What is claimed is:

1. A method of analysing lists of neighbouring cells in a cellular telecommunications system comprising a plurality of active mobile stations and a static network, the static network having a first cell and a plurality of cells neighbouring the first cell, some of the neighbouring cells being determined by an operator of the system as planned neighbouring cells, each containing the cells having a base station, wherein:

each base station transmits, on a control channel, a signal including a base station identifier of that base station;

each mobile station in the first cell is provided with an ordered control channel list of control channel frequencies to be detected by that mobile station; and each mobile station in said first cell reports messages to the static network indicating the base station identifiers of control channels detected by that mobile station and the position in the control channel list of the respective control channel;

the method comprising the steps of:

extracting from the static network such reporting messages for said first cell and producing a reporting list including, for each position in the control channel list, the number of times that any of the base station identifiers has been reported for that position;

obtaining a planned neighbour list of the control channels and respective base station identifiers of the planned neighbouring cells;

correlating the reporting list and the planned neighbour list with respect to the control channels; and analysing the correlated lists to determine whether any of the control channels is affected by bad frequency planning.

2. A method as claimed in claim 1, wherein the analysing step includes the steps of:

determining whether, for any of the control channels, there is more than one base station identifier in the planned neighbour list; and if so, classifying that control channel in a first class.

3. A method as claimed in claim 1, wherein the analysing step includes the steps of:

determining whether, for any of the control channels, there is only one base station identifier in the reporting list which does not correspond to the base station identifier in the planned neighbour list; and if so, classifying that control channel in a second class.

4. A method as claimed in claim 1, wherein the analysing step includes the steps of:

determining whether, for any of the control channels, there is more one base station identifier in the reporting list;

if so, determining whether that one of the base station identifiers in the reporting list having the larger/largest number of reports does not correspond to the base station identifier in the planned neighbour list; and if so, classifying that control channel in a third class.

5. A method as claimed in claim 1, wherein the analysing step includes the steps of:

determining whether, for any of the control channels, there is more than one base station identifier in the reporting list;

if so, determining whether that one of the base station identifiers in the reporting list having the larger/largest number of reports corresponds to the base station identifier in the planned neighbour list but is not predominant in terms of the number of reports in term of number of respects; and if so, classifing that control channel in a fourth class.

6. A method as claimed in claim 1, wherein the analysing step includes the steps of:

determining whether, for any of the control channels, there is at least one base station identifier in the reporting list but not in the planned neighbour list; and if so, classifying that control channel in a fifth class.

7. A method as claimed in claim 1, further comprising the steps of:

determining whether, for any of the control channels, the base station identifier in the planned neighbour list cannot be unambiguously correlated with the, or one of the, base station identifiers in the reporting list; and if so, classifying that control channel in a sixth class.

8. A method as claimed in claim 1, wherein the step of obtaining the planned neighbour list comprises obtaining data therefor from the operator of the system.

9. A method as claimed in claim 1, for use with a system in which the static network generates handover messages instructing mobile stations in the first cell to switch to different cells, each handover message including the control channel and base station identifier of said different cell, wherein the step of obtaining the planned neighbour list comprises the step of extracting from the static network such handover messages for handovers from said first cell, and producing the planned neighbour list from the control channels and corresponding base station identifiers in the extracted handover messages.

10. A method as claimed in claim 1, for use with a system in which the control channels are ordered in the control channel list in accordance with frequency (or channel number), and wherein the correlating step includes the step of primarily attempting to match the base station identifiers in the planned neighbour list, ordered according to control channel frequency (or channel number), with the base station identifiers in the reporting list, ordered according to position in the control channel list.

11. A method as claimed in claim 10, wherein the correlation step involves the steps of progressing through the planned neighbour list in order of control channel frequency (or channel number) and progressing through the reporting list in order of position in the control channel list.

12. A method as claimed in claim 11, wherein the correlating step includes, in each step of the progression:

determining whether the base station identifier for the current position in the planned neighbour list is related to any base station identifier, for the current position in the reporting list but not to any base station identifier, for the next position in the reporting list; and if so, determining that that base station identifier in that current position in the planned neighbour list is associated with that base station identifier in that current position in the reporting list.

13. A method as claimed in claim 11, wherein the correlating step includes, in each step of the progression:

determining whether the base station identifier for the current position in the planned neighbour list is related to any base station identifier, for the current position in the reporting list and to any base station identifier, for the next position in the reporting list; and if so:

determining whether the base station identifier for the next position in the planned neighbour list is related to any base station identifier, for the next position in the reporting list but not to any base station identifier, for the position after the next position in the reporting list, and, if so, determining that that base station identifier in that current position in the planned neighbour list is associated with that base station identifier in that current position in the reporting list; and/or determining whether the base station identifier for the next position in the planned neighbour list is not related to any base station identifier, for the next position in the reporting list, and, if so determining that that base station identifier in that current position in the planned neighbour list cannot be unambiguously associated with a base station identifier in the reporting list; and/or determining whether the base station identifier for the next position in the planned neighbour list is related to any base station identifier, for the next position in the reporting list and to any base station identifier, for the position after the next position in the reporting list, and, if so, recursively repeating the determining steps in respect of at least the subsequent positions in the planned neighbour list and the reporting list.

14. A method as claimed in claim 1, for use with a system in which the control channel list with which each mobile station is provided can change upon the mobile station changing from an idle mode to an active mode, the method further including the steps of:

detecting when one of the mobile stations changes from its idle mode to its active mode; and in response to such a detection, temporarily discarding such reporting messages extracted from the static network and relating to that mobile station.

15. A method as claimed in claim 1, for use with a system in which the control channel list with which each mobile station is provided can change upon the mobile station being handed over from one cell to another, the method further including the steps of:

detecting when one of the mobile stations is handed over from one cell to another; and in response to such a detection, temporarily discarding such reporting messages extracted from the static network and relating to that mobile station.

16. A method as claimed in claim 14, wherein the detection and discarding steps are controlled by a respective finite state machine for each mobile station which is in its active mode.

17. A method as claimed in claim 1 for use with such a system which is a GSM system, wherein:

the static network is a GSM Public Land Mobile Network ("PLMN");

the control channels are GSM Broadcast Control Channels ("BCCH"s);

the base station identifiers are GSM Base Station Identity Codes ("BSIC"s);

the control channel list is a GSM BCCH Allocation ("BA") list provided on a GSM Slow Association Control Channel ("SACCH"); and the reporting messages are GSM Measurement Result ("MEAS RES") messages.

18. An apparatus for analysing lists of neighbouring cells in a cellular telecommunications system comprising a plurality of active mobile stations and a static network, the static network having a first cell and a Plurality of cells neighbouring the first cell, some of the neighbouring cells being determined by an operator of the system as planned neighbouring cells, each of the cells having a base station, wherein:

each base station transmits, on a control channel, a signal including a base station identifier of that base station;

each mobile station in the first cell is provided with an ordered control channel list of control channel frequencies to be detected by that mobile station; and each mobile station in said first cell reports messages to the static network indicating the base station identifiers of control channels detected by that mobile station and the position in the control channel list of the respective control channel, the apparatus comprising:

means for extracting from the static network such reporting messages for said first cell and producing a reporting list including, for each position in the control channel list, the number of times that any of the base station identifiers has been reported for that position;

means for receiving or generating a planned neighbour list of the control channels and respective base station identifiers of the planned neighbouring cells;

means for correlating the reporting list and the planned neighbour list with respect to the control channels; and means for analysing the correlated lists to determine whether any of the control channels is affected by bad frequency planning.

* * * * *

UNITED STATES PATENT AND TRADEMARK OFFICE
CERTIFICATE OF CORRECTION

PATENT NO. : 6,192,244 B1
DATED : February 20, 2001
INVENTOR(S) : Daniele Abbadessa Page 1 of 1

It is certified that error appears in the above-identified patent and that said Letters Patent is hereby corrected as shown below:

<u>Claim 4</u>,
Line 9, delete "more one base station" and insert --more than one base station --.

<u>Claim 5</u>,
Lines 27 and 28, delete "in terms of the number of reports in term of number of respects" and insert -- in terms of number of reports --.

Signed and Sealed this

Seventh Day of August, 2001

*Attest:*

NICHOLAS P. GODICI
*Attesting Officer*  *Acting Director of the United States Patent and Trademark Office*